US006569283B1

United States Patent
Sperry et al.

(10) Patent No.: US 6,569,283 B1
(45) Date of Patent: May 27, 2003

(54) INFLATOR/SEALER DEVICE FOR INFLATABLE PACKAGING CUSHION

(75) Inventors: Charles R. Sperry, Florence, MA (US); Suzanne M. Scott, Springfield, VT (US); James M. Corliss, Spofford, NH (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 09/526,498

(22) Filed: Mar. 15, 2000

(51) Int. Cl.$^7$ .............................................. B32B 31/20
(52) U.S. Cl. .................. 156/583.2; 156/580; 156/583.1
(58) Field of Search .............................. 156/290, 308.2, 156/308.4, 309.6, 368, 580, 583.1, 583.4, 515, 518, 530, 555

(56) References Cited

U.S. PATENT DOCUMENTS

| | | | |
|---|---|---|---|
| 2,983,306 A | | 5/1961 | Resnick |
| 3,321,126 A | | 5/1967 | Rivman et al. |
| 3,377,186 A | | 4/1968 | McGee |
| 3,538,671 A | | 11/1970 | Wallace |
| 3,563,329 A | | 2/1971 | Wagner, Jr. |
| 3,773,235 A | * | 11/1973 | Canamero et al. .......... 226/112 |
| 4,045,272 A | | 8/1977 | Lombardi |
| 4,055,456 A | | 10/1977 | Carnegie, Jr. |
| 4,110,145 A | | 8/1978 | Lombardi |
| 4,656,814 A | | 4/1987 | Lockington |
| 4,869,051 A | * | 9/1989 | Shifley et al. ............ 156/583.7 |
| 4,912,913 A | | 4/1990 | Rundle |
| 5,041,148 A | | 8/1991 | Gereby et al. |
| 5,056,299 A | | 10/1991 | Furukawa et al. |
| 5,072,637 A | * | 12/1991 | Reichental et al. ......... 226/172 |
| 5,088,270 A | * | 2/1992 | Diehl ........................ 53/399 |
| 5,142,123 A | * | 8/1992 | Chou ........................ 156/515 |
| 5,201,166 A | | 4/1993 | Johnsen |
| 5,266,137 A | | 11/1993 | Hollingsworth |
| 5,272,856 A | | 12/1993 | Pharo |
| 5,335,483 A | * | 8/1994 | Gavronsky et al. ........... 53/451 |
| 5,337,541 A | | 8/1994 | Gmuer |
| 5,348,157 A | | 9/1994 | Pozzo |
| 5,351,720 A | | 10/1994 | Maimets |
| 5,407,520 A | | 4/1995 | Butts et al. |

(List continued on next page.)

FOREIGN PATENT DOCUMENTS

WO          99/62789          12/1999

*Primary Examiner*—Richard Crispino
*Assistant Examiner*—Cheryl N. Hawkins
(74) *Attorney, Agent, or Firm*—Daniel B. Ruble

(57) ABSTRACT

An inflator/sealer machine useful for inflating and sealing an inflatable cushion having a resistance wire that extends across the inlet of the inflatable cushion. The machine includes an inflation tube, a seal bar, and an anvil. The inflation tube is connected to a source of inflation fluid and has an outlet that is larger than the inflation aperture of the inflatable cushion. The inflation tube and anvil are adjustable between a tube/anvil engaged position and a tube/anvil disengaged position. In the tube/anvil engaged position, the inflation tube outlet opposes the anvil and can engage the inflation aperture of the inflatable cushion between the inflation tube and the anvil to inflate the cushion. The seal bar and the anvil are adjustable between a bar/anvil engaged position and a bar/anvil disengaged position. In the bar/anvil engaged position, the anvil opposes the seal bar to compress the inlet heat seal zone of the inflatable cushion between the anvil and the seal bar. Left and right contacts are positioned on opposing sides of the seal bar during the bar/anvil engaged position. The contacts are connected to an electrical power source. The contacts touch the resistance wire that extends across the inlet of the inflatable cushion to complete an electrical circuit during the bar/anvil engaged position and form a heat seal across the inlet of the inflatable cushion.

13 Claims, 16 Drawing Sheets

U.S. PATENT DOCUMENTS

| | | |
|---|---|---|
| 5,454,642 A | 10/1995 | De Luca |
| 5,470,419 A | 11/1995 | Sasaki et al. |
| 5,545,117 A | 8/1996 | Sakamoto et al. |
| 5,588,532 A | 12/1996 | Pharo |
| 5,679,208 A * | 10/1997 | Sperry et al. ............... 156/251 |
| 5,693,163 A | 12/1997 | Hoover et al. |
| 5,743,989 A | 4/1998 | Kumagai et al. |
| 5,762,197 A | 6/1998 | Farison |
| 5,772,565 A | 6/1998 | Weyandt |
| 5,814,175 A | 9/1998 | Rau et al. |
| 5,829,492 A | 11/1998 | Gavronsky et al. |
| 5,830,780 A | 11/1998 | Dennison et al. |
| 5,862,914 A | 1/1999 | Farison et al. |
| 5,942,076 A | 8/1999 | Salerno et al. |
| 5,957,583 A | 9/1999 | DeClements, Jr. et al. |
| 5,968,306 A * | 10/1999 | Kleinhenz et al. .......... 156/290 |
| 6,003,288 A * | 12/1999 | Sperry et al. .............. 53/371.4 |

* cited by examiner

INFLATOR/SEALER DEVICE FOR INFLATABLE PACKAGING CUSHION

BACKGROUND OF THE INVENTION

The present invention relates to an inflator/sealer device useful for inflating and sealing an inflatable cushion.

Packagers are increasingly using air-inflated cushions formed from relatively thin films of thermoplastic to protect their packaged goods within boxes, sleeves, or cases during shipping and storage. For example, an inflatable packaging cushion system that can protect a wide variety of packaged goods is sold by Sealed Air Corporation under the VISTAFLEX trademark. The VISTAFLEX inflatable packaging cushion includes an inflation inlet designed for use with an inflation/sealing machine provided by Sealed Air Corporation under the BT-1 trademark. As depicted in FIG. 1, the inflation inlet 12 of the inflatable cushion 10 has top and bottom sheets 14, 16 sealed at the peripheral zone 18 to form an inlet passageway 20. The BT-1 inflator/sealer controls both the inflation of the cushion with compressed air and sealing of the inflated cushion with an impulse heat sealer.

To inflate and seal the VISTAFLEX cushion, a user inserts the inflation tube 22 of the prior art inflator/sealer (not shown) into the inflation inlet 12 of the cushion 10. (FIGS. 2–3.) The inflator/sealer inflates the cushion by opening a valve to allow compressed air to pass through the inflation tube 22 into the interior of the cushion chamber 24 until the cushion chamber has been inflated to the desired pressure. (FIG. 4.) At that point, a heat seal bar 26 compresses the top and bottom sheets of inlet 20 to prevent the inflated cushion from deflating. (FIG. 5.) The heat seal bar includes heating element 28. An electric current passes through the heating element 28 to heat the element, which then conducts heat to the compressed top and bottom sheets of the inlet until the sheets reach the heat seal initiation temperature. The electric current is then discontinued to heating element 28 to allow it to cool while the heat seal bar continues to compress the top and bottom films. Once the resulting heat seal has cook point where the heat seal is set, the heat seal bar 26 disengages. (FIGS. 6–7.) The resulting heat seal 30 is formed transversely across inlet passageway 20 to seal cushion chamber 24 in the inflated state.

The BT-1 inflation system allows a packager to inflate and seal inflatable packaging cushions in a consistent, reliable, and easy manner at the site where the goods are to be packaged. For example, the BT-1 machine may complete an inflation and sealing cycle for a packaging cushion in about 8 seconds. Nevertheless, packagers desire an even faster and more reliable system for inflating and sealing inflatable packaging cushions.

SUMMARY OF THE INVENTION

The present invention addresses the aforementioned problems. A first aspect of the invention is directed to a machine for inflating and sealing an inflatable cushion of the present invention. The machine includes a base that supports an inflation tube, a seal bar, and an anvil. The inflation tube has an inlet portion connected to a source of inflation fluid and an outlet portion that is larger than the inflation aperture of the given inflatable cushion. The inflation tube and anvil are adjustable between a tube/anvil engaged position and a tube/anvil disengaged position. In the tube/anvil engaged position, the inflation tube outlet portion opposes the anvil. The inflation tube and the anvil are capable of engaging the inflation portion of the inflatable cushion between the inflation tube and the anvil. In doing so, the inflation tube outlet portion surrounds the inflation aperture and places the inflatable body of the inflatable cushion in fluid communication with the source of inflation fluid. In the tube/anvil disengaged position, the inflation tube and anvil are spaced apart so that the inflation portion of the inflatable cushion may be inserted or withdrawn from between the inflation tube and the anvil.

The seal bar and the anvil of the first aspect of the invention are adjustable between a bar/anvil engaged position and a bar/anvil disengaged position. In the bar/anvil engaged position, the anvil opposes the seal bar so that the anvil and seal bar are capable of compressing the inlet heat seal zone of the inflatable cushion between the anvil and the seal bar. In the bar/anvil disengaged position, the anvil and seal bar are spaced apart so that the inlet heat seal zone of the inflatable cushion may be inserted or withdrawn from between the anvil and the seal bar. Left and right contacts are positioned on opposing sides of the seal bar at least during the bar/anvil engaged position. The contacts are connected to an electrical power source. The contacts are capable of touching the resistance wire of the inflatable cushion to complete an electrical circuit during the bar/anvil engaged position.

A second aspect of the invention is directed to a machine for sealing an inflatable cushion of the present invention. The machine includes a seal bar and an anvil, which are adjustable between an engaged position and a disengaged position. In the engaged position, the anvil opposes the seal bar so that the anvil and seal bar are capable of compressing the inlet heat seal zone of the given inflatable cushion. In the disengaged position, the anvil and seal bar are spaced apart, so that the inlet heat seal zone of the given inflatable cushion can be withdrawn from between the anvil and seal bar. Left and right contacts are positioned on opposing sides of the seal bar when the seal bar and anvil are in the engaged position. The contacts are connected to an electrical power source. The contacts are capable of touching the resistance wire of the given inflatable cushion to complete an electrical circuit when the seal bar and anvil are in the engaged position.

A third aspect of the invention is directed to a machine for inflating an inflatable cushion of the present invention. The machine includes an inflation tube and an anvil. The inflation tube is connected to a source of inflation fluid. The outlet portion of the inflation tube is larger than the inflation aperture of the given inflatable cushion. The anvil defines a slot. The inflation tube and anvil are adjustable between an engaged position and a disengaged position. In the engaged position, the inflation tube outlet portion opposes the slot of the anvil. The inflation tube and anvil are capable of engaging the inflation portion of the given inflatable cushion between the inflation tube and the anvil so that the inflation tube outlet portion surrounds the inflation aperture of the inflatable cushion. In the disengaged position, the inflation tube and anvil are spaced apart, so that the inflation portion of the inflatable cushion may be inserted or withdrawn from between the inflation tube and the anvil.

The inflatable cushion of the present invention provides several advantages. Since the resistance wire heating element is positioned internally in the inflation inlet of the cushion, the resistance wire transfers heat directly to the portion of the cushion films that actually form the heat seal (e.g., the heat seal layers). There is no need to heat the outer portion or layers of the cushion material to heat seal the inlet passageway of the cushion. Further, since there is no need to heat any portion of the inflator/sealer device itself in order to heat seal the packaging cushion, the inflator/sealer may operate essentially at room temperature. It is only the relatively small resistance wire within the inflatable cushion that is heated to a heat seal temperature—and that high temperature occurs on the inside of the inflation inlet of the cushion.

Since there is no need to conduct heat through the full thickness of the cushion films, as is required by an external heated-bar sealer (e.g., conductance-type heat sealer), the inflation inlet may be sealed more quickly than by the use of a conductance heat sealer. For example, the heat seal cycle time may be less than about 1 second, preferably less than about 0.5 seconds total for the heating and cooling cycle.

Further, by avoiding the use of a high-temperature sealing jaw of a conductance heat sealer, the present invention increases reliability while reducing the complexity, manufacture cost, and operating cost of the sealing units. There is no need to "warm up" the inflator/sealer—nor does the inflator/sealer have elements, such as a heated jaw, whose temperature may change according to the heating demand and drift over the period of operation. The inventive inflator/sealer may be operated sequentially to produce a series of inflated/heat sealed cushions. In doing so, the inflator/sealer creates a stable heat seal environment that produces more uniform heat seals from the first heat seal in a series to the last.

The inflatable cushions may be provided in a deflated or flat condition, so that a stack or roll of the inflatable cushions occupy a relatively small amount of space. This minimizes the costs of shipping and storing the inflatable cushions. Further, the inflator/sealer device may be located at the end-user's plant so that the cushions may be conveniently inflated, for example, just before the cushion is used in a packaging application.

These and other objects, advantages, and features of the invention will be more readily understood and appreciated by reference to the detailed description of the invention and the drawings.

DETAILED DESCRIPTION OF THE INVENTION

Figure 22:
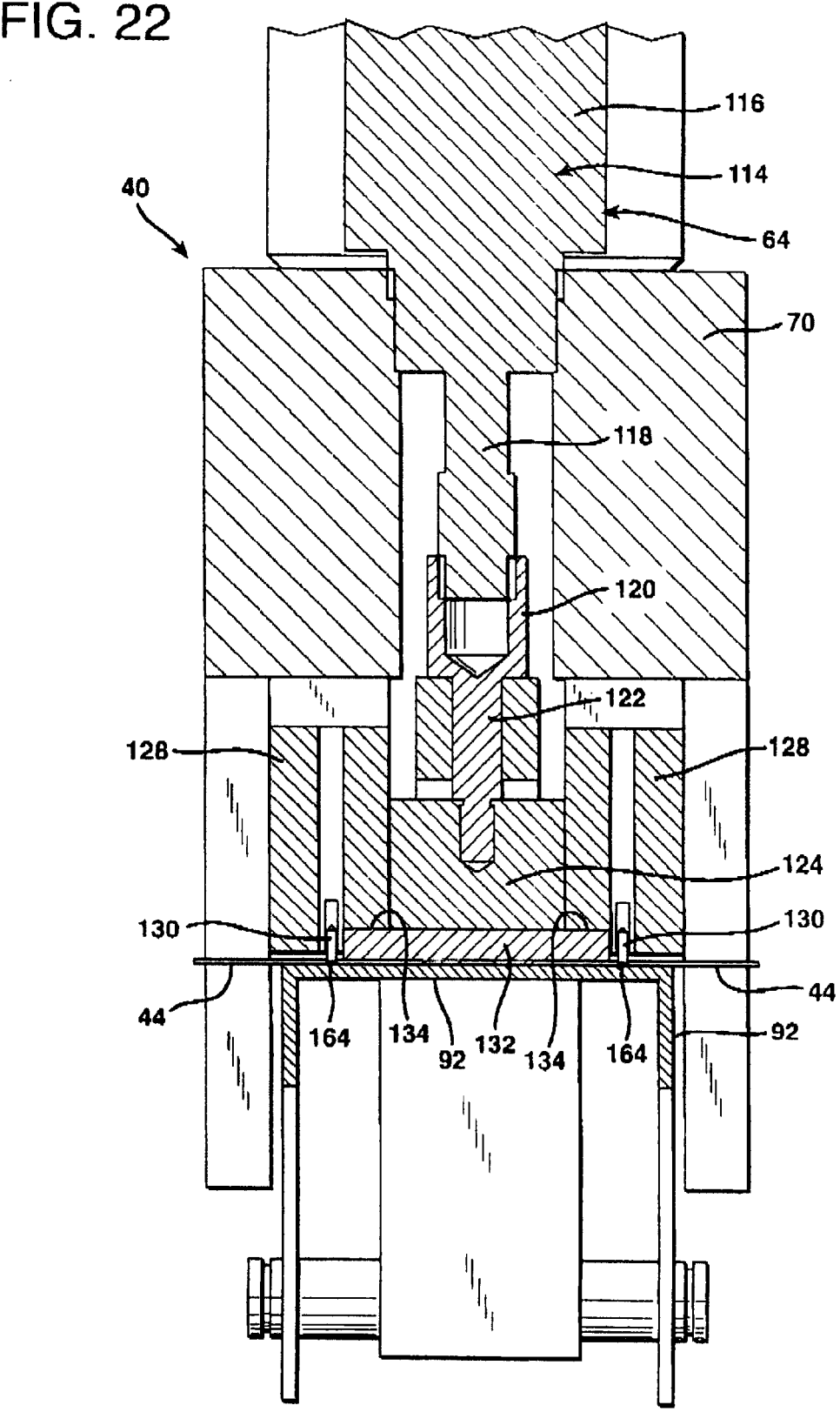
FIG. 22 is a fragmentary front elevational view of the device and cushion of FIG. 16 modified to show an extended seal pad configuration.

The inflatable cushion 44 of the present invention (FIG. 8) may be inflated and sealed by the sealer/inflator device 40 of the present invention (FIGS. 10–17). Further, a continuous web 184 of inflatable cushions 168 (FIG. 9) may be formed by the production line 182 of the present invention. (FIG. 22.) The inventive inflatable cushion and its related aspects are the subject matter of U.S. patent application Ser. No. 09/525,345 by Charles R. Sperry and Suzanne M. Scott issued as U.S. Pat. No. 6,276,532 on Aug. 21, 2001 entitled "Inflatable Packaging Cushion with a Resistance Wire" filed on the same day and owned by the same entity as the present application. That application is incorporated herein in its entirety by this reference.

Inflatable Cushion

Figure 8:
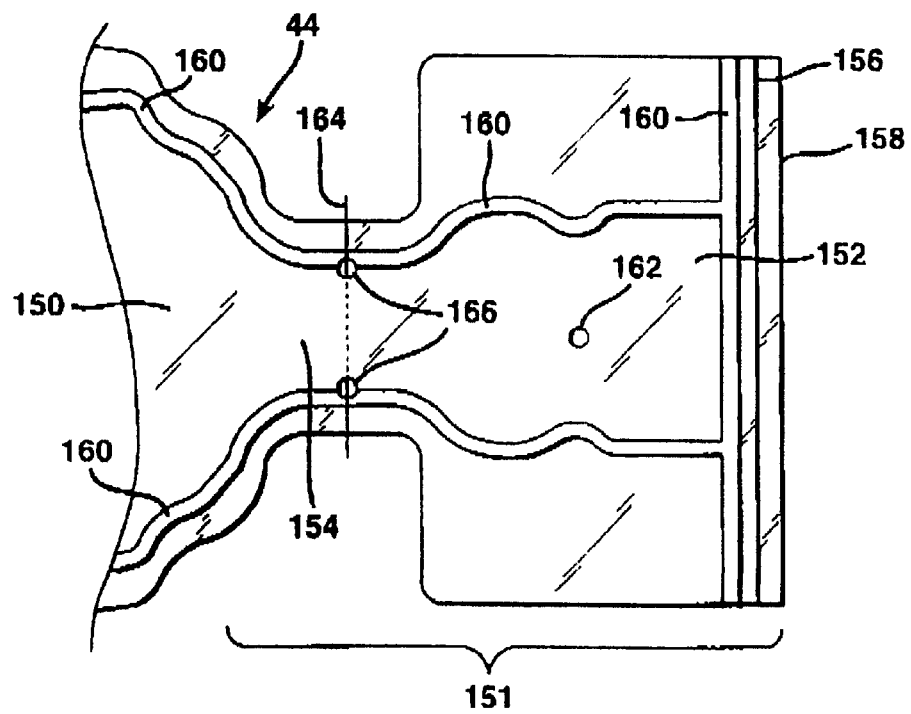
FIG. 8 is a fragmentary plan view of the inflatable cushion of the present invention showing the inflation inlet.

The fluid-fillable (i.e., inflatable) cushion 44 of the present invention includes an inflatable body 150 and an inflation inlet or conduit 151 connected to the inflatable body 150. (FIG. 8.) The inflation inlet or conduit 151 may comprise an inflation portion 152 and an inflation passageway or throat 154. The inflation throat 154 places inflation portion 152 in fluid communication with the inflatable body 150. Preferably, conduit 151 is flexible.

The inflation inlet 151 has a given internal width extending transversely across the inlet at each point along its lateral length. For example, the internal width of the inflation inlet 151 as illustrated in FIG. 8 is the distance between the heat seal zones 160 on opposing sides of the inflation inlet. The resistance wire 164 (discussed below) extends at least across the internal width of the inflation inlet. If the inflation inlet has a circular cross-section, then the diameter of the circular cross-section may be considered the transverse width.

The inflation conduit 151 may comprise one or more side or lateral walls. As illustrated in the drawings, conduit 151 has two side or lateral walls formed by top and bottom sheets 156, 158. Further, the inflatable body 150 and inflation inlet 151 of the inflatable cushion 44 may comprise at least two sheets—a top sheet 156 and bottom sheet 158—that are sealed together in perimeter or peripheral zone 160, for example by a heat seal.

At least one of the lateral walls of the inflation conduit 151 defines an inflation aperture 162. For example, the top sheet 156 defines inflation hole or aperture 162 in a preferably central area of inflation portion 152. As depicted in the drawings, the axis of inflation aperture 162 forms an angle relative to the longitudinal axis of inflation passageway 154, the angle being less than 180°, preferably about 90°, when the inflation passageway is laid out straight.

The top and bottom sheets or films 156, 158 comprise a flexible material—for example, a flexible, relatively gas-impermeable, thermoplastic film—suitable for forming an inflatable cushion. The embodiment illustrated in the drawings includes top and bottom sheets formed as separate sheets; however, the terminology "top" and "bottom" or "at least two" sheets as used in this application includes the sense of one sheet of material folded over upon itself to form top and bottom portions. The top and bottom sheets 156, 158 may be mono- or multi-layered thermoplastic films that may include polymers such as polyethylene, polyurethane, poly (ethylene-vinyl acetate). If the film has a multilayer construction, then the film may include: i) an outer layer of a heat-sealable material to assist in heat sealing films together, as well as ii) a gas barrier layer to decrease the gas permeability of the film, as is known in the art. The top and bottom films may have any thickness suitable for the cushion application. However, the present invention is particularly useful where the film has a thickness of at least about 0.003 inches, more particularly at least about 0.004 inches, since at these thicknesses the advantage of the present invention of not having to heat the entire film thickness to form the heat seal becomes pronounced.

The inflatable body 150 (shown in fragmentary aspect in FIGS. 8–9) may take any desired shape, dimension, and configuration—and may further comprise one or more chambers, such as interconnected inflation chambers (not shown). The inflatable body 150 may be designed for use in any number of inflatable (i.e., fluid-fillable) applications, such as packaging, dunnage, mattresses, rafts, floatation devices, and the like. If the inflatable cushion 44 is an inflatable packaging cushion, then the inflatable body 150 has a shape, dimension, and configuration suitable for protecting the selected packaged good. Such configurations are known to those skilled in the art of inflatable packaging cushions.

Suitable film materials to form the inflatable cushion—and examples of suitable inflatable packaging cushion body configurations—are disclosed in one or more of: i) U.S. Pat. No. 5,588,533 issued Dec. 31, 1996 to Farison; U.S. Pat. No. 5,620,096 issued Apr. 15, 1997 to Pozzo; U.S. Pat. No. 5,762,197 issued Jun. 9, 1998 to Farison; U.S. Pat. No. 5,803,263 issued Sep. 8, 1998 to Pozzo; U.S. Pat. No. 5,862,914 issued Jan. 26, 1999 to Farison; and ii) U.S. patent application Ser. No. 09/089,524 filed Jun. 3, 1998 by Pozzo (corresponding to International Publication No. WO 99/62789 published Dec. 9, 1999); U.S. patent application Ser. No. 09/236,793 filed Jan. 25, 1999 by Farison; U.S. patent application Ser. No. 09/437,411 filed Nov. 10, 1999 by Wofford et al; and U.S. patent application Ser. No. 09/438,562 filed Nov. 10, 1999 by Ahlgren. Each of these previously recited patents and patent applications is incorporated herein in its entirety by reference.

A resistance wire 164 extends at least across the internal width of the inflation inlet 151, for example across throat 154 between top sheet 156 and bottom sheet 158. Further, the resistance wire 164 may extend across throat 154 only in the portion of throat 154 defined at its edges by zones 160. In such case, resistance wire 164 may extend out of contact holes 166 defined by top sheet 156 on either side of throat 154. (FIG. 8.)

Figure 9:
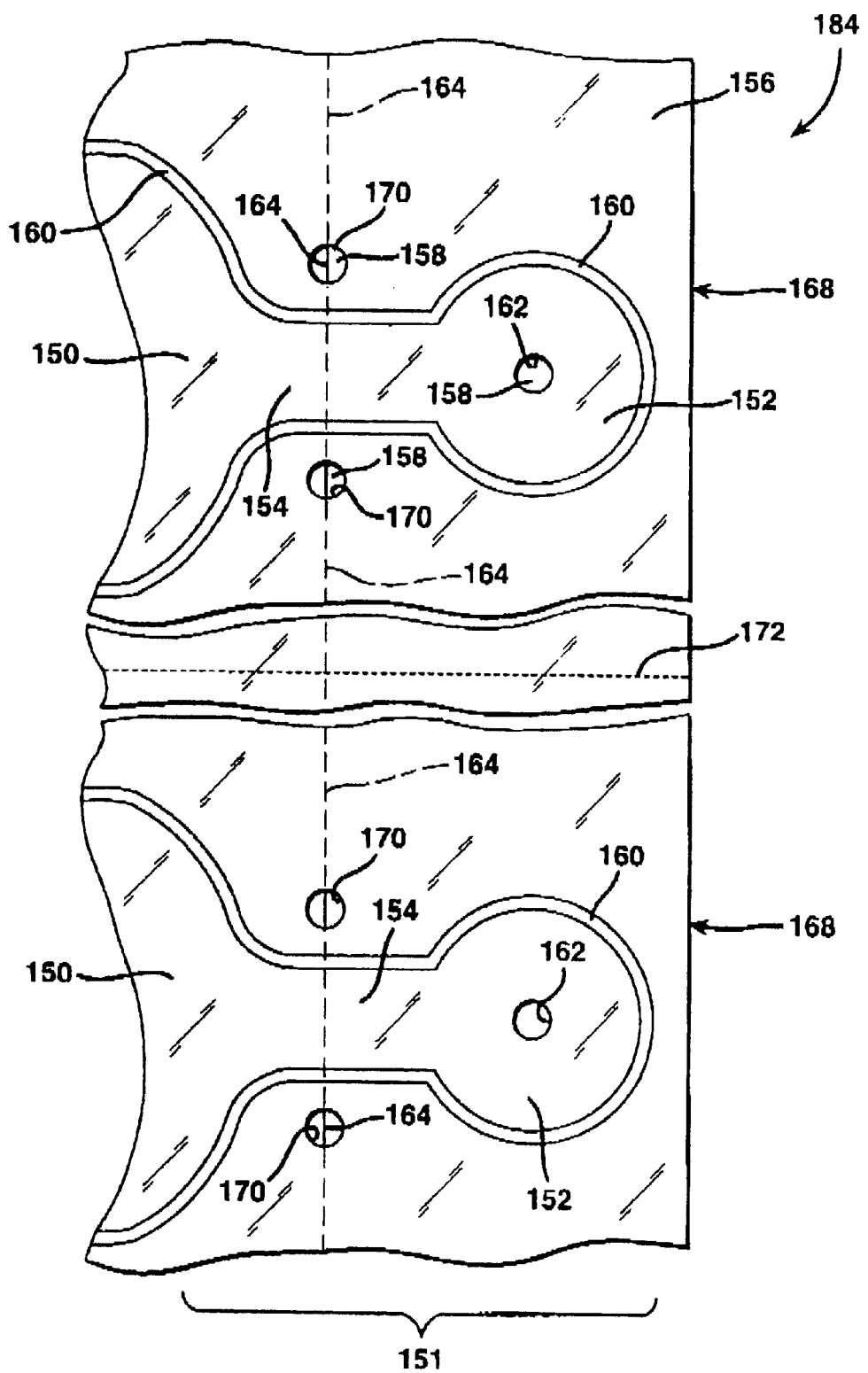
FIG. 9 is a fragmentary plan view of a web containing a plurality of inflatable cushions of another embodiment of the present invention.

Alternatively, resistance wire 164 may extend continuously between top and bottom sheets 156, 158 across the width of inflatable cushion 168. (FIG. 9.) In such case, the resistance wire may extend between top and bottom sheets 156, 158 even within the perimeter zone 160. Top sheet 158 defines contacts holes 170, which may be located outside of throat 154. The contact holes 170 expose resistance wire 164 where it passes in the area of contact holes 170. One or more inflatable packaging cushions 168 may be joined by perforation lines 172, which allow the inflatable packaging cushions 168 to be provided in a continuous web 184 and later separated from the web either before or after inflation.

Resistance wire 164 may comprise any material that heats rapidly upon the application of an electrical current such that at least a portion of the thermoplastic material in the top and bottom sheets 156, 158 that is adjacent to the resistance wire may achieve a softened or melted state suitable to form a heat seal. Compositions (e.g., metal alloys) suitable for resistance wires are known to those of skill in the art. For example, resistance wire 164 may comprise a circular-cross sectional metal wire, such as a nichrome resistance wire. The term "wire" includes cross-sectional configurations other than circular—such as, rectangular, flat, semicircular, or oval.

Figure 1:
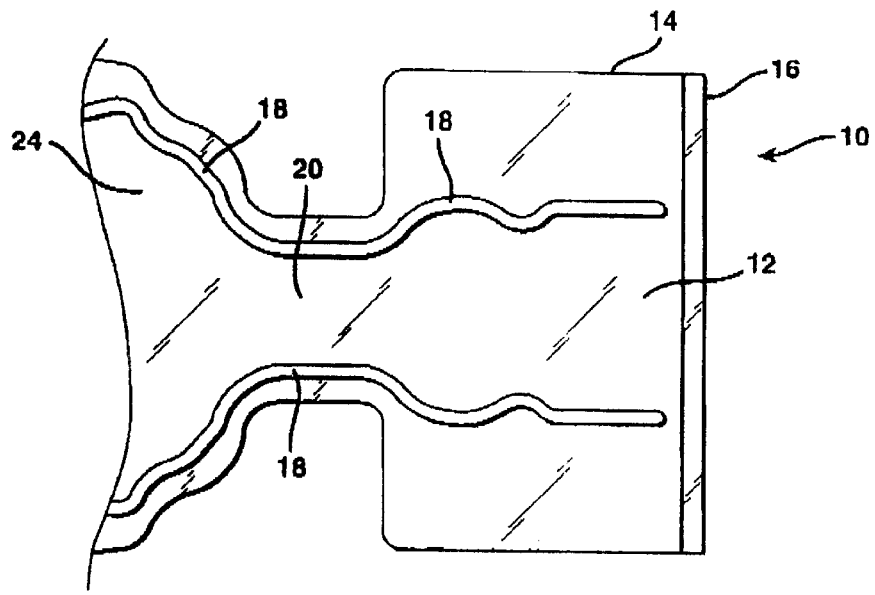
FIG. 1 is a fragmentary plan view of a prior art inflatable packaging cushion showing the inlet.
Figure 2:
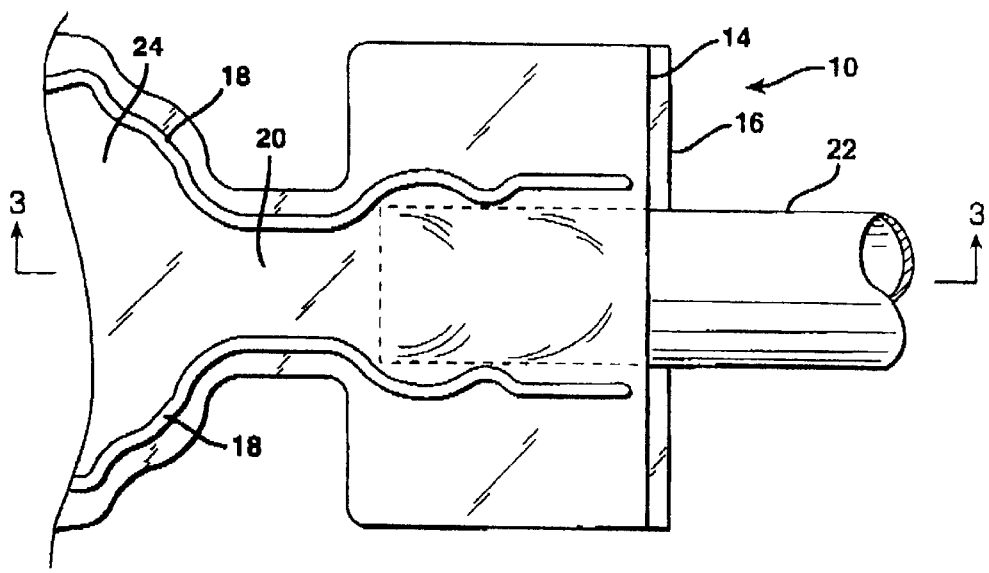
FIG. 2 is the fragmentary plan view of the packaging cushion inlet of FIG. 1 showing an inserted inflation nozzle.
Figure 3:
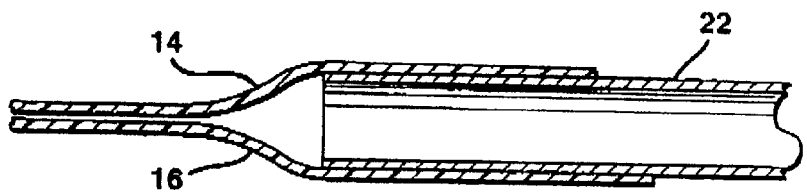
FIG. 3 is a fragmentary sectional view of the inflation inlet of FIG. 2 taken along line 3—3.
Figure 4:
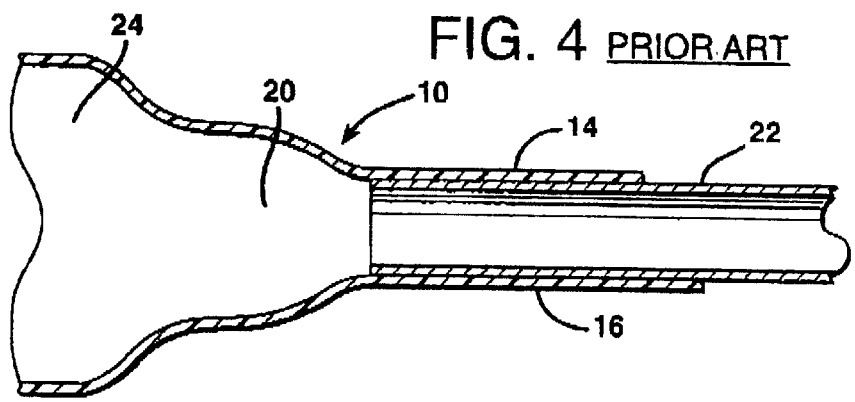
FIG. 4 is a fragmentary side elevational view of the inflation inlet of FIG. 3 showing the packaging cushion in the inflated state.
Figure 5:
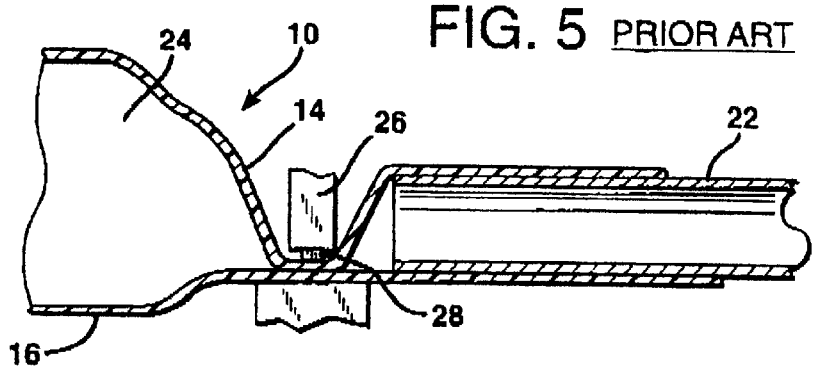
FIG. 5 is a fragmentary side elevational view of the packaging cushion of FIG. 4 showing a heat sealed inflation inlet.
Figure 7:
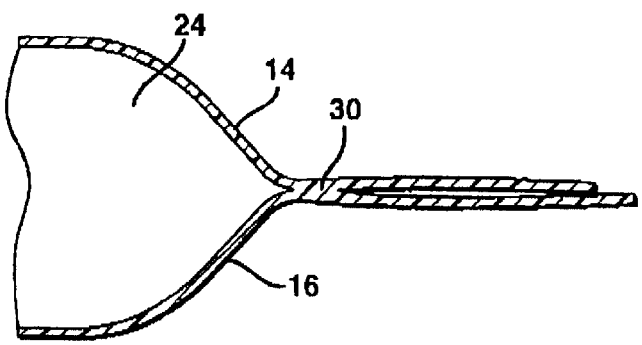
FIG. 7 is a fragmentary sectional view of the inflatable packaging cushion of FIG. 6 taken along line 7—7.
Figure 6:
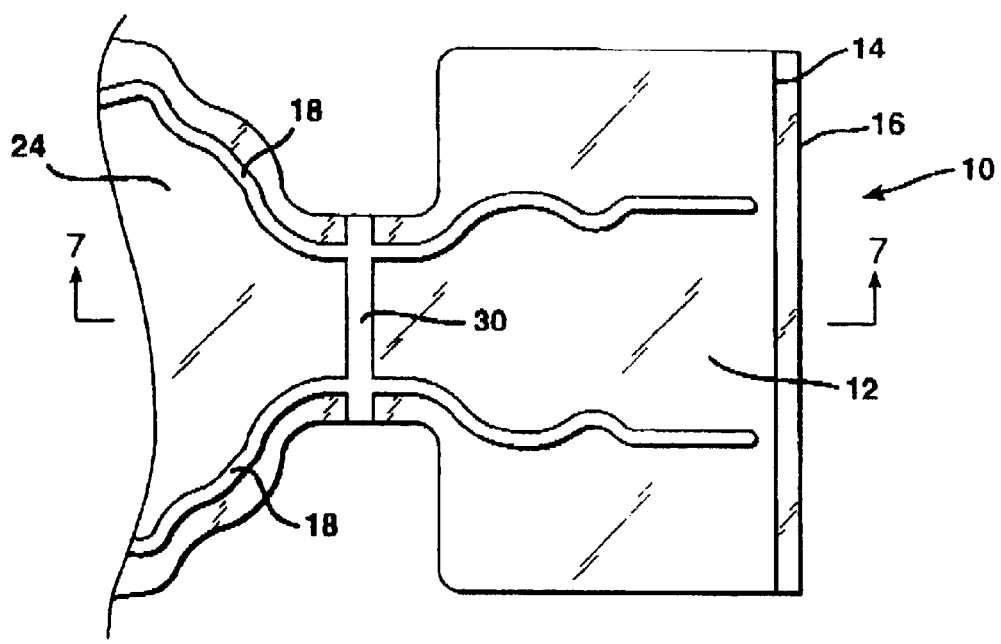
FIG. 6 is a fragmentary plan view of the prior art inflatable packaging cushion of FIG. 1 in the inflated and sealed state.

The optimal cross-sectional thickness for resistance wire 164 for a given heat seal application may be determined by routine experimentation by those of skill in the art, and depends upon the physical characteristics of both the resistance wire 164 (e.g., resistivity) and the films 156, 158 (e.g., thickness and melt characteristics). Useful ranges for the cross-sectional thickness or diameter of resistance wire 164 include (in ascending order of preference) less than 0.010 inches, less than 0.006 inches, less than 0.004 inches, from about 0.0005 to about 0.010 inches, from about 0.006 to about 0.001 inches, and from about 0.002 to about 0.004 inches. By way of example, a useful cross-sectional thickness for the resistance wire 164 ranges from about 0.003 to about 0.005 inches, preferably about 0.004 inches for a resistance wire having a 20 weight % chromium/80 weight % nickel alloy composition for use in the inflation inlet of an inflatable cushion having the configuration shown in FIG. 1 of U.S. patent application Ser. No. 09/437,411 filed Nov. 10, 1999 by Wofford et al (previously incorporated by reference), where: i) the cushion is inflated to from about 6.5 to about 7 psig, ii) the top and bottom films 156, 158 each have a thickness of from about 0.004 to about 0.005 inches, and iii) the films have the composition set forth in any of Examples 1–24 of U.S. patent application Ser. No. 09/438, 562 filed Nov. 10, 1999 by Ahlgren (previously incorporated by reference).

The resistance wire 164 is preferably provided clean or free from processing-oil residue on the wire's surface (i.e., "petroleum-free") so that such residue oil cannot interfere with the heat seal process, for example, by preventing the resistance wire from sticking to the top and bottom films. Further, the resistance wire 164 may be coated with one or more layers of heat-sealable thermoplastic material (not shown) to assist in forming the heat seal (discussed below). Such a coating of heat-sealable thermoplastic material may be the same as or different from the sealing layer (if any) of the top or bottom sheets. The resistance wire may be continuously coated with such a coating—or the coating may be provided solely on one or more selected portions of the resistance wire to correspond with the sealing zone 176 (discussed below) of the cushion. Also, the resistance wire 164 may incorporate protrusions, barbs, roughened areas, pits, and the like, which increase the surface area of the resistance wire and may enhance the heat-seal adhesion of the top and bottom films to the resistance wire.

Inflator/Sealer Device

Inflator/sealer 40 includes base 50 and inflation/sealing tower 48 that is mounted to base 50. Base 50 is constructed of a material having sufficient strength and weight to mechanically support tower 48 of the sealer/inflator device 40 during operation. (FIGS. 10–17.)

Supply stack plate or platform 54 is supported by base 50. Supply stack plate 54 may hold a supply stack 42 of inflatable cushions 44 of the present invention so that the cushions may be readily and serially available for inflation/sealing, as discussed below. To that end, the supply stack platform is at least partially beneath the inflation tube assembly 62 (discussed below). One or more clip blocks 55 (FIG. 12) or clip pins (not shown) may help orient or position the supply stack 42 on plate 54. Supply stack plate 54 may be either permanently or removeably attached to or supported by base 50. If the supply plate 54 is removeably attached, then a first supply plate designed to hold a first configuration of inflatable cushion may be easily removed and exchanged for a second supply plate designed to hold a second configuration of inflatable cushion. Means for attaching supply plate 54 include welding, adhering, screwing, bolting, and the like. The means for removeably attaching supply plate 54 to base 50 that is illustrated in the drawings includes one or more bolts or screws 56 that pass into or through mounting holes 52 in supply plate 54 and base 50.

Inflation/sealing tower 48 supports the retraction assembly 58, paddle assembly 60, inflation tube assembly 62, and sealing assembly 64. In the embodiment illustrated in the drawings, these assemblies are each at least in part mounted to main block 70, which in turn is mounted to tower 48.

Turning to the retraction assembly 58 (FIGS. 10, 13), main block 70 includes a first bore 72 in which is mounted the bottom open end 65 of outer suction tube 66. Top end 67 of outer suction tube 66 is in fluid communication with a suction source (not shown), such as an air pressure vacuum generator. Inner suction tube 68 is slideably fitted or received within outer suction tube 68, much as the inner tube of a slide trombone is slideably fitted within a trombone's outer tube. The bottom end 74 of the inner suction tube 68 is mounted to the top side of seal block 76 so that inner suction tube 68 is in fluid communication with first bore 78 of seal block 76. Suction cup 80 is mounted to the bottom side of seal block 76 so that the central bore 82 is in fluid communication with first bore 78 of seal block 76.

If the top end 67 of outer suction tube 66 is also in fluid communication with the pressurized inflation-fluid source that is connected to inflation tube assembly 62 (discussed below), then first bore 78 of seal block 76 includes check valve 79, which blocks the flow of pressured fluid toward the bottom of seal block 76 while permitting the suction of fluid toward the top of seal block 76. A suitable check valve configuration includes ball 81 positioned within first bore 78 to move with the flow of fluid so that the ball seats against the top of suction cup 80 when the pressure within first bore 78 is elevated and unseats from suction cup 80 when the pressure within first bore 78 is decreased below ambient pressure. Other suitable check valve configurations are known to those of skill in the art.

Figure 10:
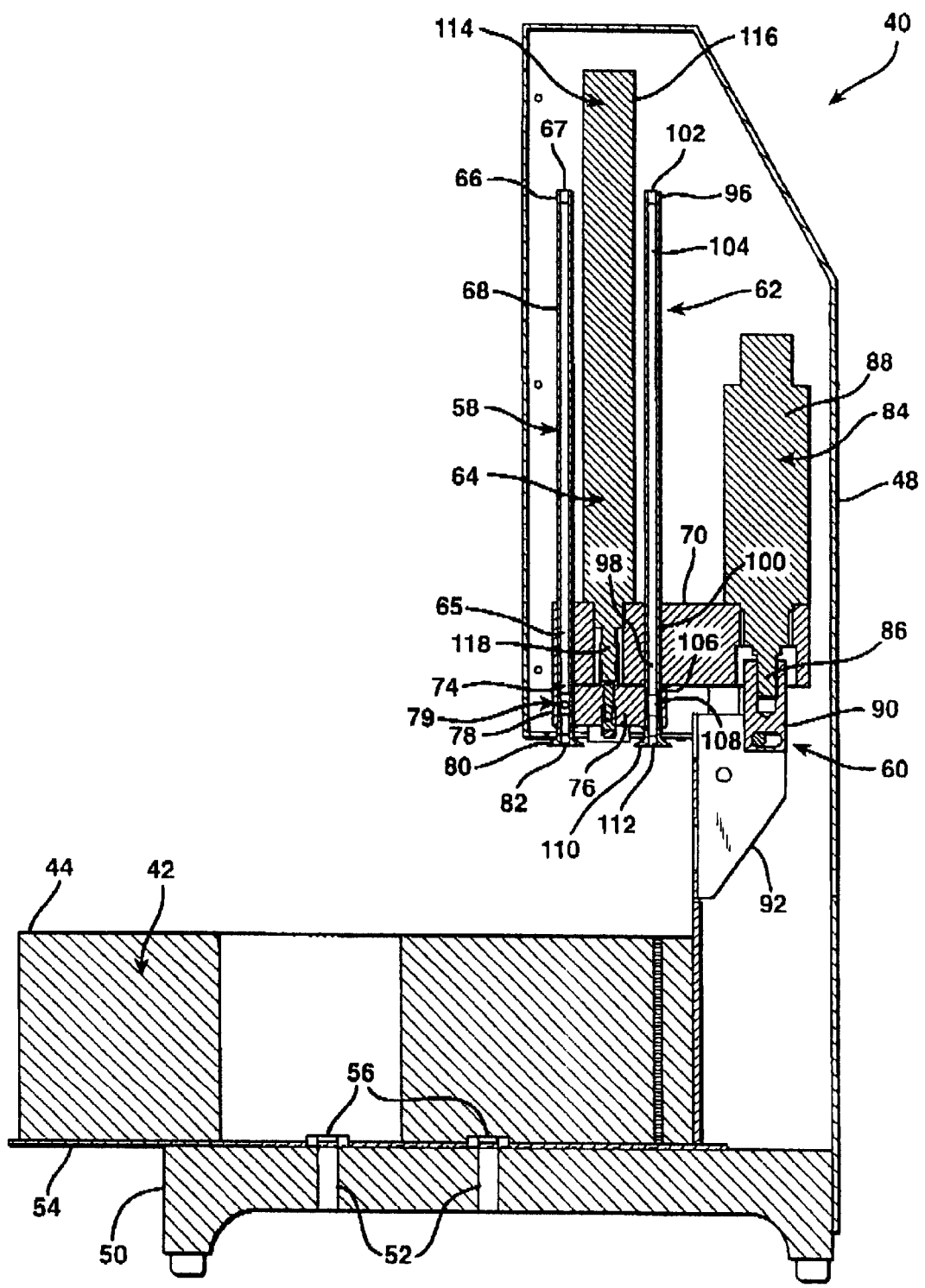
FIG. 10 is a fragmentary side elevational view of the inflator/sealer device of the present invention with a supply stack of the inflatable cushions of the present invention.
Figure 11:
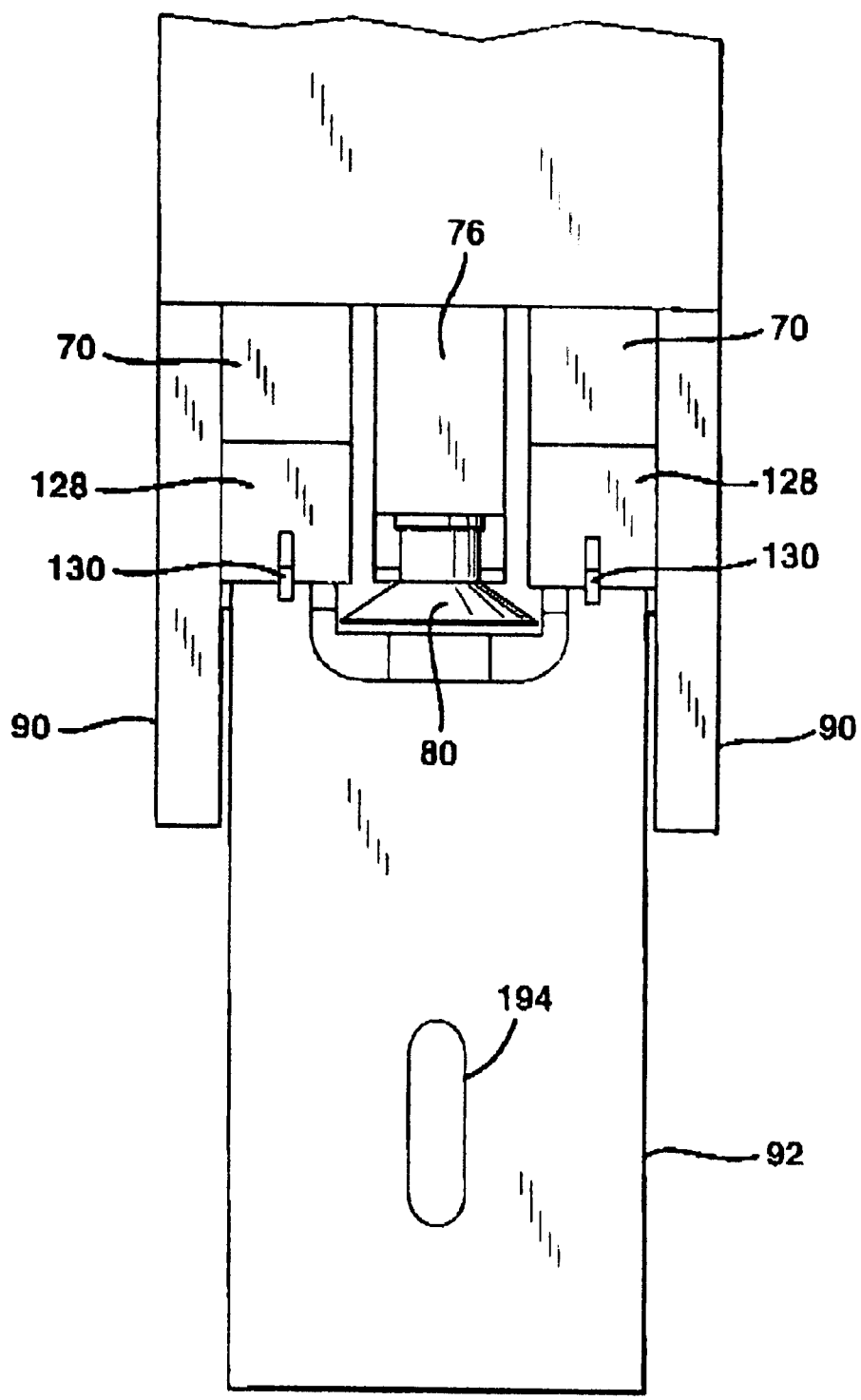
FIG. 11 is a fragmentary front elevational view of the device of FIG. 10.
Figure 13:
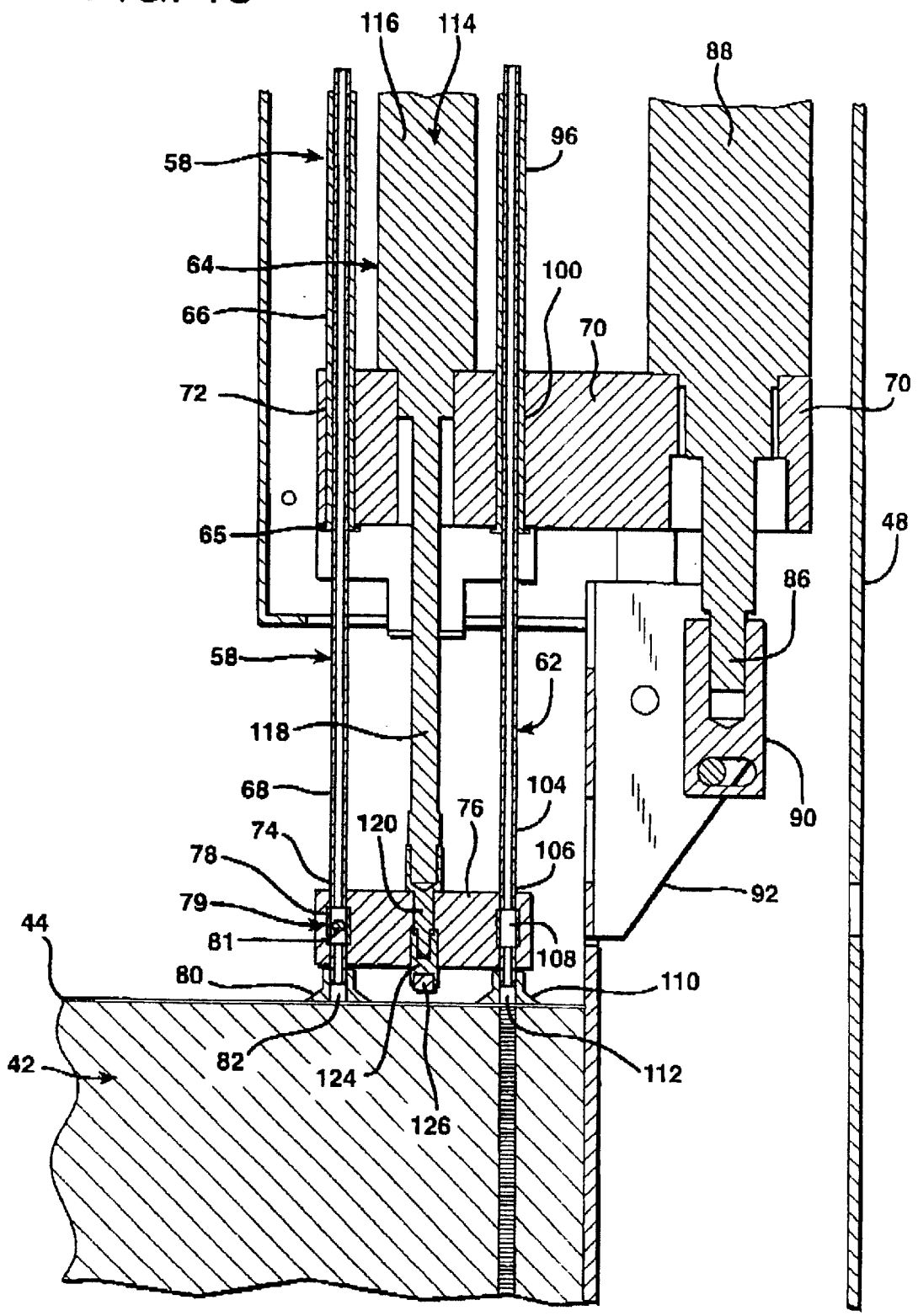
FIG. 13 is a fragmentary sectional view of the device of FIG. 12 taken along line 13—13 of FIG. 12.
Figure 14:
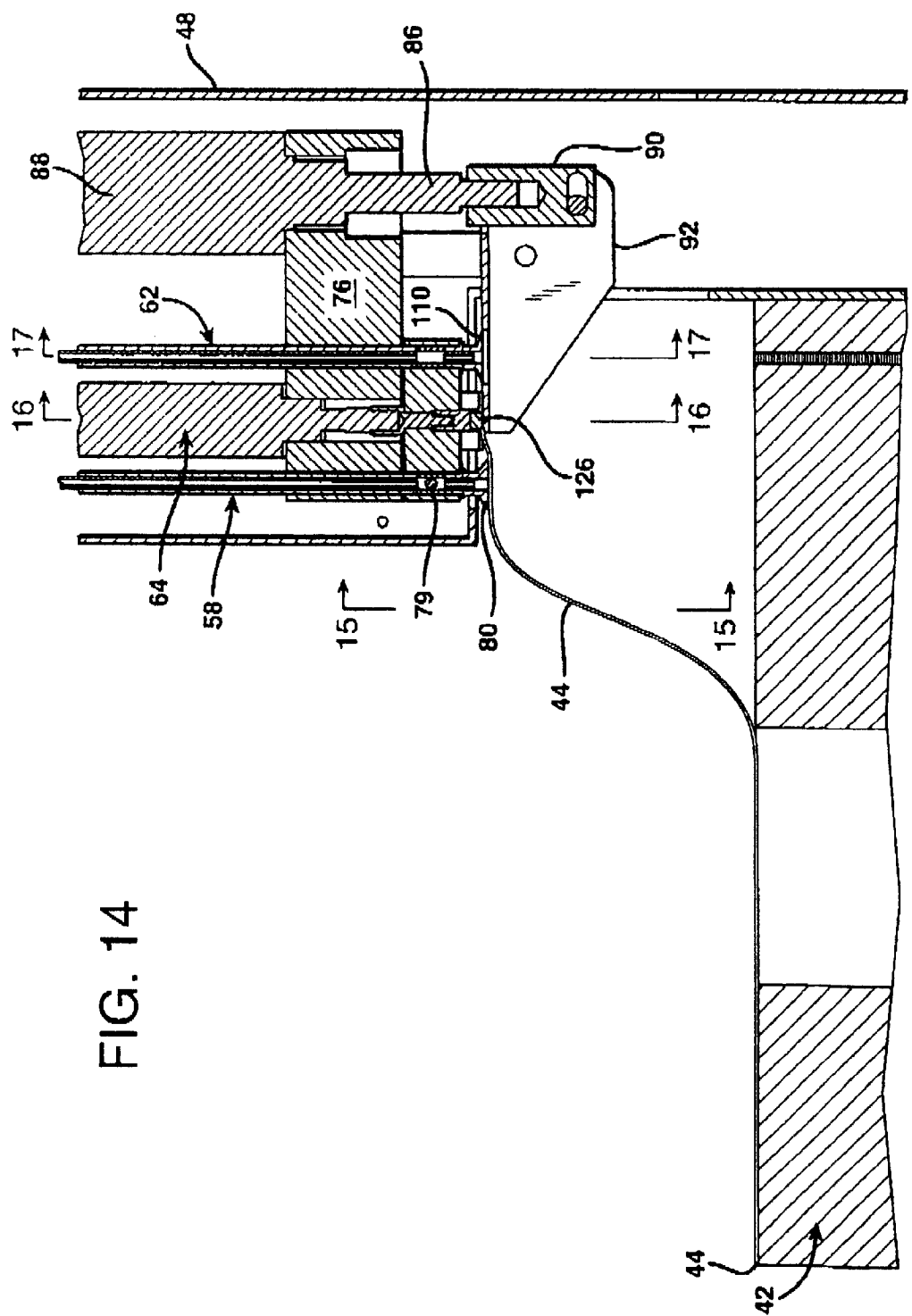
FIG. 14 is a fragmentary side elevational view of the device of FIG. 13 with the sealing block retracted, the anvil in the upright position, and the non-inflated cushion engaged.

Paddle assembly 60 is mounted to or supported by tower 48. (FIGS. 10–11, 14.) Paddle assembly 60 includes rear piston 84 mounted to or supported by main block 70. Piston 84 includes piston rod 86, which is extendible from piston cylinder 88 through main block 70. Piston cylinder 88 is in fluid communication with a compressed or hydraulic fluid source (not shown) to provide a power source for extending piston rod 86 from cylinder 88. Piston rod 86 is connected to a first end of pivot block 90. The opposite end of pivot block 90 is pivotally mounted to anvil 92. Anvil 92 is in turn pivotally mounted to tower 48 so that the anvil can rotate between: i) a down or disengaged position (FIGS. 10–13)—in which piston rod 86 is retracted within cylinder 88 and anvil 92 is relatively flush with tower 48—and ii) an engaged position (FIGS. 14–20), in which piston rod 86 is extended from cylinder 88 so that anvil 92 is relatively horizontal and engaged with inflation tube assembly 62 and sealing assembly 64 (discussed below). Anvil 92 includes inflation slot 94 (FIGS. 11, 14, 17–20) located under the inflation tube assembly 62 when the anvil is in the engaged position.

Inflation tube assembly 62 includes an outer inflation tube 96 having an open bottom end 98 mounted in a second bore 100 of main block 70. (FIGS. 10, 13–14.) Top end 102 of outer inflation tube 96 is in fluid communication with a source (not shown) of inflation fluid. The inflation fluid may be any liquid or gas, such as compressed or pressurized air, that is suitable for inflating an inflatable cushion. Top end 102 may optionally be in fluid communication with the suction source that is connected to retraction assembly 58. Inner inflation tube 104 is slideably fitted or received within outer inflation tube 96, in a similar manner as inner suction tube 68 is slideably fitted within outer suction tube 66. The bottom end 106 of inner inflation tube 104 is mounted to or supported by the top side of seal block 76 so that inner inflation tube 104 is in fluid communication with second bore 108 of seal block 76. Inflation cup 110 is mounted to the bottom side of seal block 76 so that the central bore 112 of the inflation cup is in fluid communication with second bore 108 of seal block 76.

Sealing assembly 64 includes forward sealer piston 114 mounted to main block 70. (FIG. 13.) Sealer piston 114 includes piston rod 118 extendible from cylinder 116, which is in fluid communication with a source (not shown) of compressed or hydraulic fluid used to power the sealer piston 114. Piston rod 118 is fitted within or attached to the top end of plunger 120. Plunger 120 extends through a third bore 122 of sealing block 76. The bottom end of plunger 120 fits into or is attached to one end of foot 124. Seal bar or pad 126 is fitted within the opposite end of foot 124. Seal bar or pad 126 may comprise metal, but preferably comprises a resilient non-conductive material—such as silicone or RTV rubber—suitable for exposure to heat-seal temperature conditions.

Figure 15:
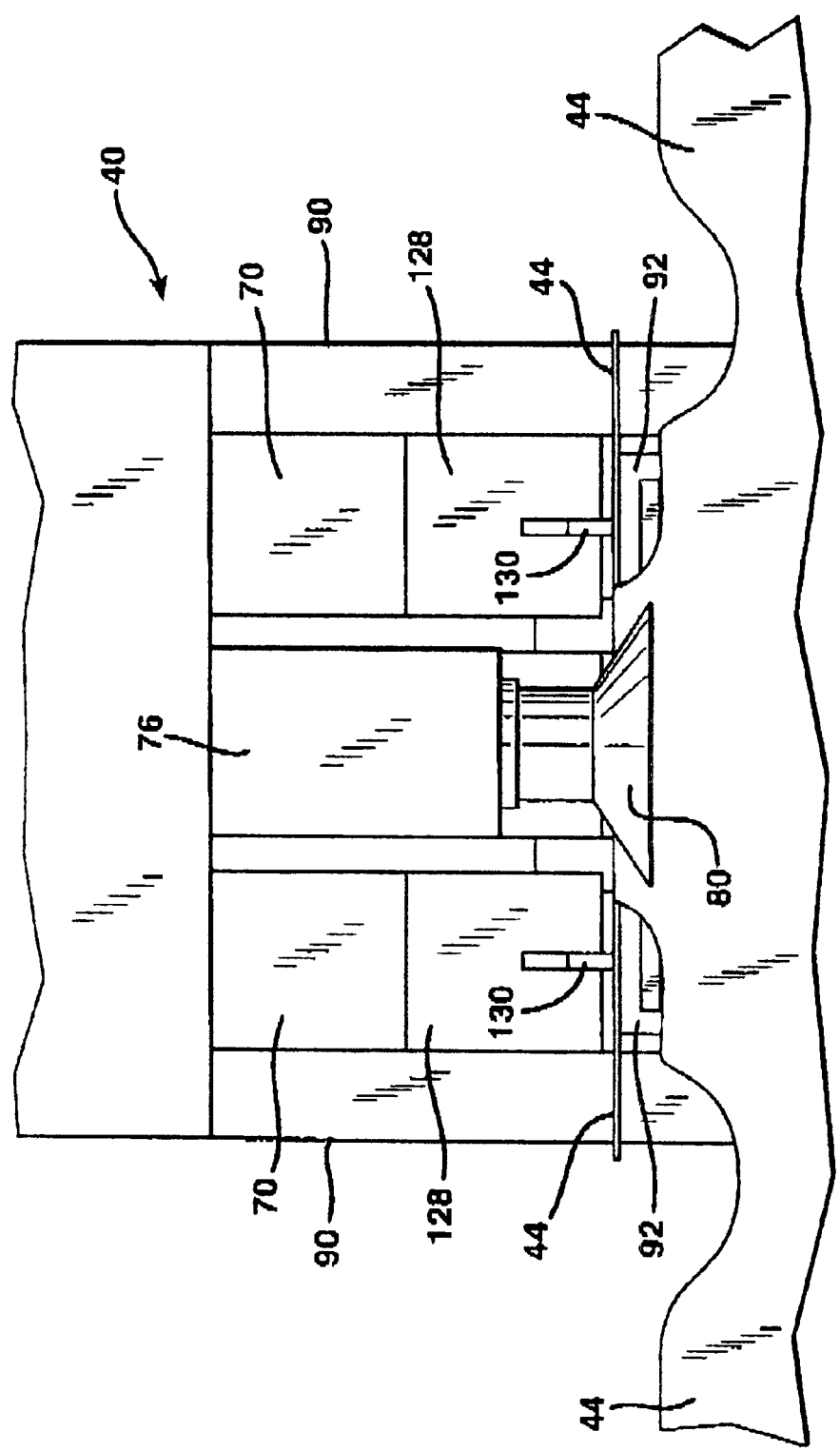
FIG. 15 is a fragmentary front view of the device and cushion of FIG. 14 taken along line 15—15 of FIG. 14.
Figure 16:
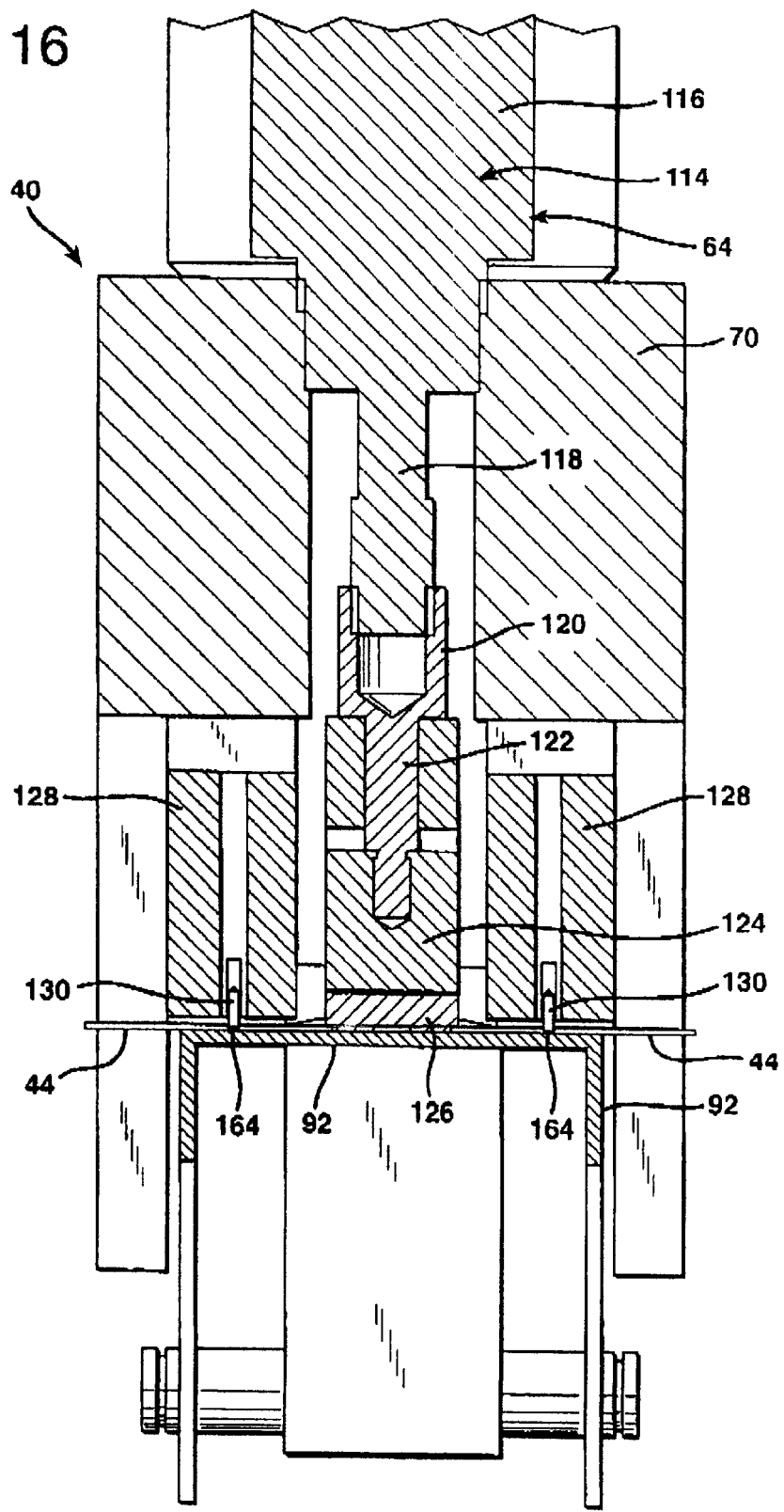
FIG. 16 is a fragmentary sectional view of the device and cushion of FIG. 14 taken along line 16—16 of FIG. 14.
Figure 17:
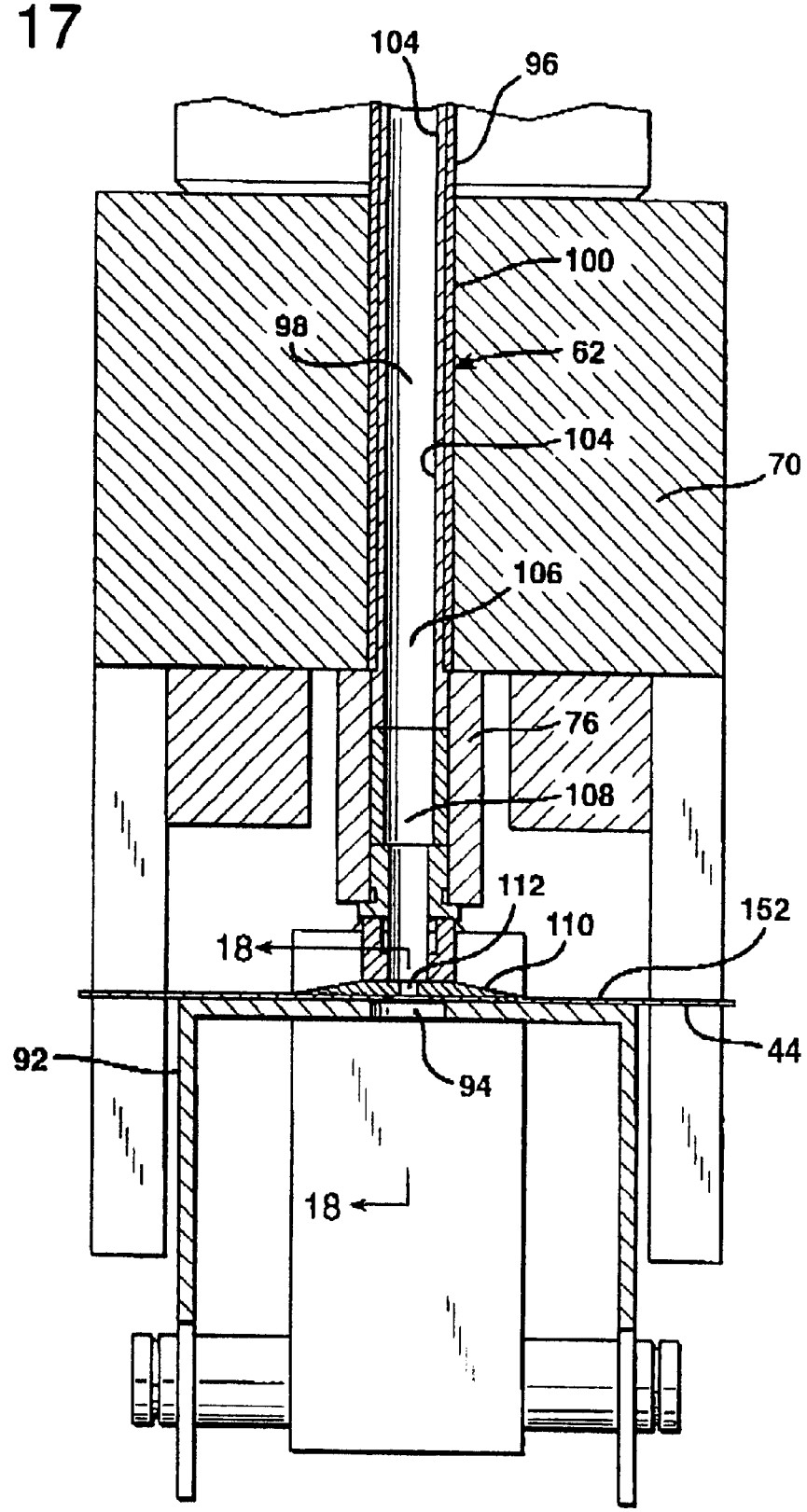
FIG. 17 is a fragmentary sectional view of the device and cushion of FIG. 14 taken along line 17—17 of FIG. 14.

Contact blocks 128 are mounted to or supported by main block 70 on the left and right sides of foot 124 when the piston rod 118 is withdrawn into cylinder 116 (i.e., sealing assembly is in the retracted position). (FIGS. 11, 15, 16.) The contact blocks preferably comprise a nonconductive material of suitable strength and hardness to withstand the operating conditions. Suitable materials include plastic, such as acetal thermoplastic resin sold by DuPont under the trademark DELRIN. Electrical contacts 130 are fitted within the contact blocks 128 so that a portion of the contacts extend outside the bottom of the contact blocks 128. The electrical contacts 130 are electrically connected to an electrical impulse source (not shown), preferably a constant current source, that is suitable for powering an impulse sealer. Such sources are well known to those of skill in the art. The contacts 130 comprise an electrically conductive material, such as brass or other types of metal. The contacts 130 may have a pointed end (not shown) that, for example terminates in a sharp point, if it is desired that the contacts be capable of piercing one or more layers of cushion material to make electrical contact with resistance wire 164. Optionally, the contacts 130 may be spring loaded (not shown) by placing a spring on the top of the contact to bias the contact in a downward direction.

Figure 23:
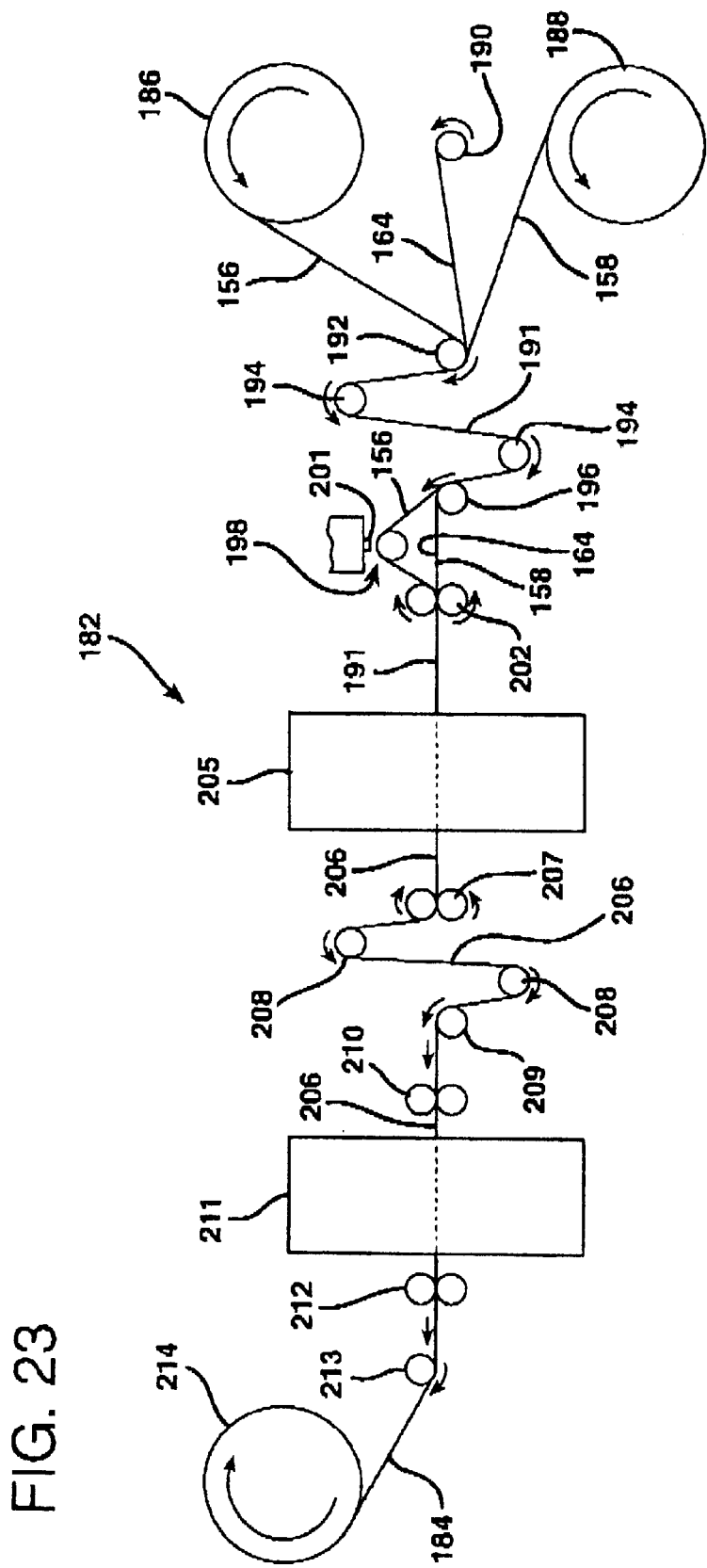
FIG. 23 is a representational side elevational schematic drawing of the production line of the present invention for forming a continuous web of inflatable cushions.

FIG. 23 illustrates a preferred embodiment in which extended seal pad 132 extends sufficiently close to contacts 130 to minimize unconstrained heating of heating element 164 during operation (discussed below). In this embodiment, contact blocks 128 have relief portions 134 to allow the extended seal pad 132 to extend essentially the entire length of the resistance wire between the contacts 130.

Operation of the Inflator/Sealer

Figure 12:
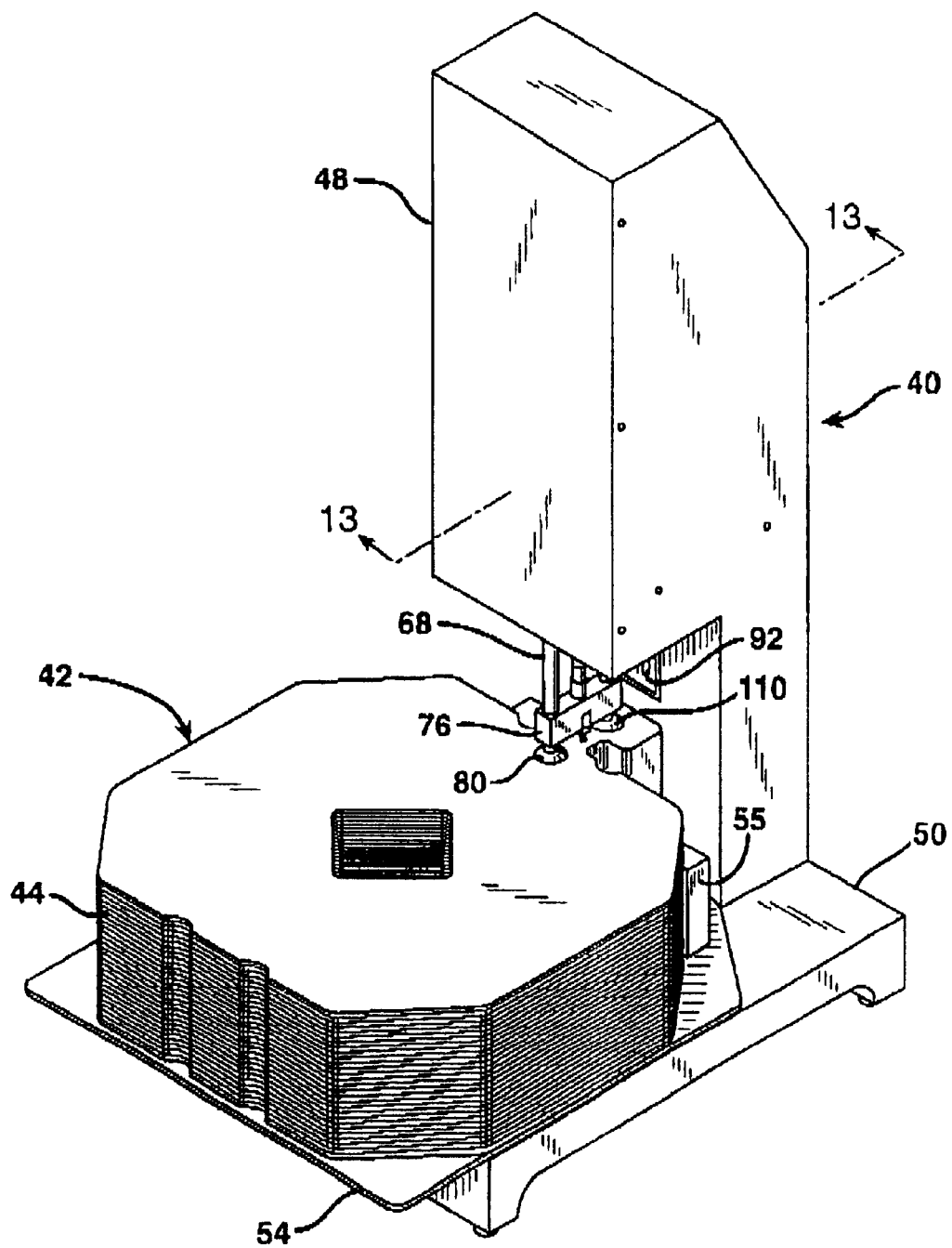
FIG. 12 is a perspective view of the device of FIG. 10 with the sealing block extended to engage the supply stack of inflatable cushions.

To operate the inflator/sealer device 40, a stack 42 of inflatable cushions 44 that are placed onto supply stack plate 54. The retraction assembly 58 of inflator/sealer device 40 may then be activated to lift an inflatable cushion 44 from the stack. To activate the retraction assembly, pressurized fluid is fed to sealing piston 114 to extend piston rod 118 from the sealing piston cylinder 116. This action forces seal block 76 down until suction cup 80 and inflation cup 110 engage inflatable cushion 44 on the top of the stack 42. (FIGS. 12–13.) Next, a suction is drawn on outer and inner suction tubes 66, 68 to decrease the pressure at central bore 82 of suction cup 80. As a result, suction cup 80 holds one inflatable cushion 44 (i.e., suctionably attaches or suctionably holds an inflatable cushion to the suction cup). Optionally, a suction may simultaneously (or instead) be drawn on outer and inner inflation tubes 96, 104 of inflation tube assembly 62 to decrease the pressure at central bore 112 of inflation cup 110, which causes the inflation cup 110 to also hold the inflatable cushion 44. The pressurized fluid within sealing piston 116 is then released (or redirected) so that piston rod 118 is retracted and seal block 76 is returned to the retracted, starting position (i.e., against main block 70)—with one inflatable cushion at least partially lifted from stack 42.

To inflate an inflatable cushion using the inflator/sealer device 40, after an inflatable cushion 44 has been retracted or lifted as discussed above, the paddle assembly 60 is engaged. The paddle assembly is engaged by feeding pressurized fluid to piston cylinder 88 to extend piston rod 86. This action moves pivot block 90 so that anvil 92 is raised to an upright, horizontal position, which places the anvil and inflation tube assembly 62 in a tube/anvil engaged position where the inflation cup 110 opposes the inflation slot 94 of the anvil. (FIG. 14, 18.) As a result, anvil 92 forces the inflation portion 152 of inflatable cushion 42 snugly against inflation cup 110 of the inflation tube assembly 62. The inflation cup 110, which is larger than the inflation aperture 162, surrounds the inflation aperture of the inflatable cushion, to place the inflation assembly 62 in fluid communication with the inflatable body 150. The inflation cup assists in forming a temporary "seal" between the inflation assembly and the inflation portion of the inflatable cushion.

Figure 18:
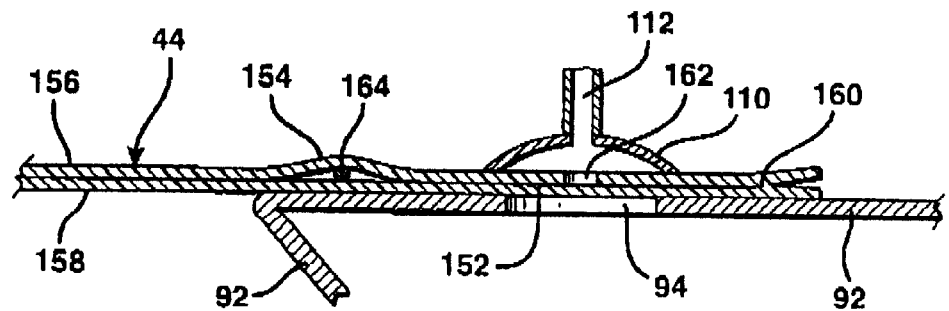
FIG. 18 is a fragmentary sectional representative view of the inflatable cushion and device of FIG. 17 taken along line 18—18 of FIG. 17.
Figure 19:
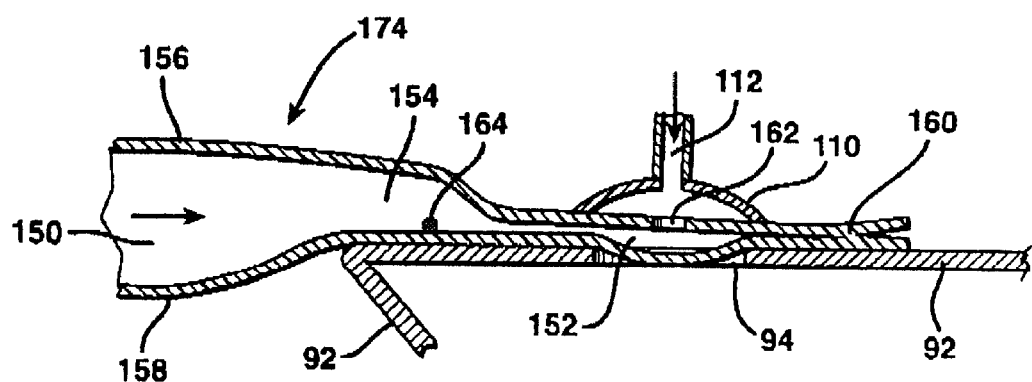
FIG. 19 is a fragmentary side elevational representative view of the inflated cushion of FIG. 18.

The inflation tube assembly 62 is then activated by feeding pressurized inflation medium, such as compressed air, into outer and inner inflation tubes 96, 104. The pressurized fill medium passes through central bore 112 of inflation cup 110 and subsequently through the inflation hole 162 in top sheet 156. (FIG. 18.) This causes the top and bottom sheets 156, 158 to bulge slightly away from each other as the inflation medium enters the inflation portion 152. In doing so, bottom sheet 158 in the inflation portion 152 extends into inflation slot 94 of anvil 92. This allows the inflation fluid medium to pass through the inflation portion 152, through inflation passageway 154 and into inflation body 150. (FIG. 19.) As the inflatable cushion 44 is inflated to become inflated cushion 174, the top and bottom sheets 156, 158 bulge away from each other until the inflation body 150 achieves its inflated shape and desired inflation pressure. The terms "inflation," "inflated," and "inflatable" include the sense where the cushion has taken the desired shape, but the pressure within inflatable body 150 is equal to or only slightly above atmospheric pressure—for example as in a dunnage bag application where above-atmospheric pressure is not necessarily required. Useful inflated pressures within body 150 may range from about 0 psig to about 15 psig, from about 1 psig to about 14 psig, and from about 2 psig to about 12 psig.

Figure 20:
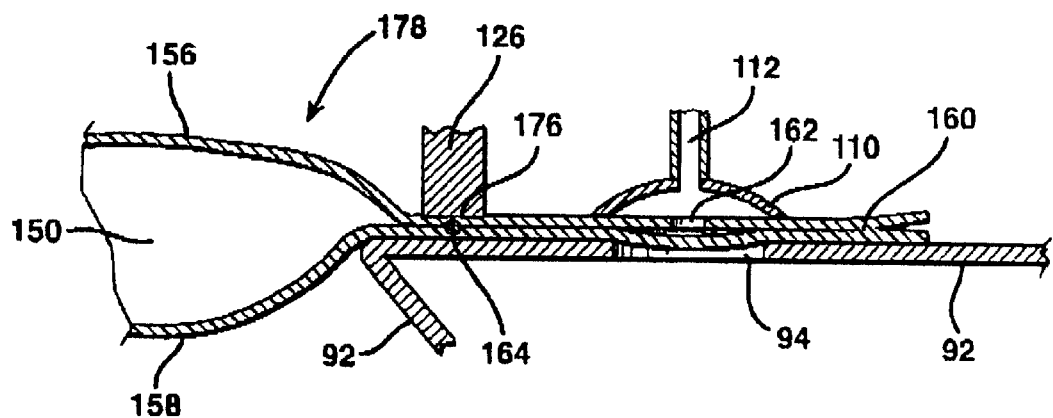
FIG. 20 is a fragmentary side elevational representative view of the inflated and sealed cushion of FIG. 19.

To seal an inflatable cushion of the present invention using the inflator/sealer device 40, once an inflatable cushion has been retracted and inflated, as discussed above, the sealing assembly 64 is activated. The sealing assembly is activated by feeding pressurized fluid into sealing piston 114 to extend piston rod 118 from piston cylinder 116. The piston rod pushes down on seal block 76, plunger 120, and foot 124 until seal pad 126 opposes and presses firmly against anvil 92 and across throat 154 in the region of the resistance wire 164 (i.e., inlet heat seal zone 176) of the now inflated cushion 174 that is between the seal bar and anvil. (FIGS. 16, 20.) The sealing pad 126 in this bar/anvil engaged position closes or pinches shut the inlet passageway 154 so that inflation portion 150 is no longer in fluid communication with inflation portion 152.

At least while the seal bar 126 and anvil 92 are in the engaged position, anvil 92 also forces inflatable cushion 44 against contacts 130 so that the contacts engage or touch (i.e., are capable of establishing electrical communication with) resistance wire 164. For example, the contacts 130 may touch wire 164 where it is exposed at the contact holes 166 on either side of throat 154. (FIGS. 8, 16.) An electrical impulse source (not shown), preferably a constant current source, is activated to provide an electrical current through a completed electrical circuit that includes the contacts 130 and resistance wire 164. The current flow causes the resistance wire 164 to heat rapidly and transfer heat to the top and bottom films 156, 158 until a sufficient portion of the films is softened or melted so that a heat seal can be formed.

The seal pad 126 distributes pressure evenly in the heat seal area to cause the softened thermoplastic of the films to extrude and meld together around the resistance wire. At this point, the electrical impulse source is turned off while the sealing pad 126 maintains the pressure in the heat seal area until the inlet heat seal 176 has cooled sufficiently to set or harden. (FIG. 20.) As a result, the resistance wire 164 is encased or imbedded within inlet heat seal 176.

In the embodiment utilizing extended seal pad 132 (FIG. 23), the extended seal pad also compresses the portions of the resistance wire 164 that extend essentially up to contacts 130 and outside of the heat seal zone across throat 154. Compressing the essentially entire length of resistance wire between the contacts provides the benefit of a more uniform heating across the length of the resistance wire 164. This is because such configuration in effect creates a basically uniform heat sink across the essentially entire length of the resistance wire between the contacts 130. If the essentially entire length of resistance wire between the contacts is not compressed by the seal pad, then the portion of the resistance wire that is not compressed by the seal pad may have a lower heat-transfer gradient because of the lack of thermal communication with the seal pad as a heat sink source during the sealing operation. As a result, the uncompressed portion of resistance wire may tend to heat up more than the portion of the resistance wire that is compressed by the seal pad. Further, the resistance of the resistance wire tends to increase as the temperature of the wire increases, which may lead to hot spots in the unconstrained (i.e., uncompressed by the seal pad) portions of the resistance wire. Thus, hot spots or overheating of a portion of the resistance wire may be minimized where the seal pad compresses the essentially entire length of resistance wire 164 between contacts 130. The term "essentially entire length of the resistance wire between the contacts" includes the sense of extending close to the contacts, such that a small portion of the resistance wire may not be compressed by the seal pad but where the resulting effect on the heat sink effect of the seal pad with respect to the resistance wire is not significant—that is, the unconstrained portion of the resistance wire does not result in hot spots or overheating during operation.

Figure 21:
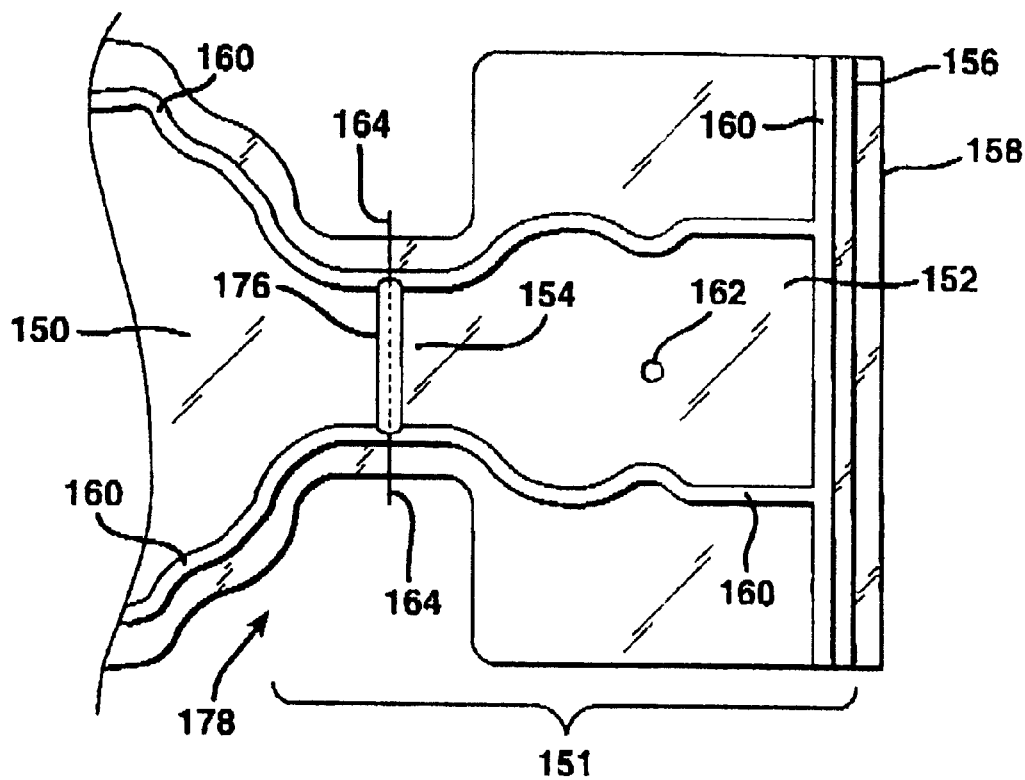
FIG. 21 is a fragmentary plan view of an inflated and sealed cushion of the present invention.

After the heat seal has been formed, the pressurized fluid in sealing piston 116 is then released (or redirected) to retract piston rod 118 and seal block 76. This adjusts the seal pad 126 and anvil 92 to a bar/anvil disengaged position in which seal pad 126 is disengaged from both anvil 92 and the now inflated and sealed cushion 178 (FIG. 21). As a result, the inlet heat seal 176 is exposed to the pressure within the inflated body 150 of the cushion. At the same time, the pressurized fluid is released from (or redirected within) piston cylinder 88 so that anvil 92 is returned to the down position. The inflated and sealed cushion 178 can now be removed from the inflator/sealer device 40 because the anvil 92 and seal bar 126 are spaced apart (i.e., the bar/anvil disengaged position)—and the anvil 92 and inflation tube assembly 62 are spaced apart (i.e., the tube/anvil disengaged position). The inflation/sealing process may then be repeated for another inflatable cushion from supply stack 42.

The time required to use the inflator/sealer device 40 to inflate and seal a given configuration for an inflatable cushion of the present invention is less than the time required to inflate and seal the same configuration for a prior art cushion using a conventional impulse heat sealer, preferably less than two-thirds the time, more preferably less than half the time. Further, the inlet heat seal 176 may be quickly and directly exposed to the pressure within the inflated cushion body 150 without heat-seal failure (i.e., separation or delamination of the top and bottom sheets forming the inlet). This exposure without heat-seal failure may occur within less than about 2 seconds, preferably less than about 1 second, more preferably less than about 0.5 seconds after the initiation of the heat seal (i.e., contact of the resistance wire 164 with the contacts 130 to complete the electrical circuit). Further, this exposure without heat-seal failure may be to an inflated pressure of at least about (in ascending order of preference) 2 psig, 4 psig, 6 psig, 8 psig, 10 psig, and 12 psig within the inflation body 150.

The inventive inflatable cushion is illustrated in the drawings with one resistance wire 164 extending across the inflation inlet. The use of only one resistance wire to form heat seal 176 has been shown to be adequate for many packaging cushion applications and configurations. However, if a redundant seal arrangement is desired, for example for additional assurance that the packaging cushion does not leak or fail at the inflation inlet, then the packaging cushion may include two or more resistance wires arranged in a parallel fashion across the inflation inlet. (In such case, the resistance wires are preferably connected in an electrical series when forming the closed circuit that heats the resistance wires.) Thus, upon activation of such multiple resistance wires in the manner discussed above with respect to one resistance wire, the cushion will form a series of heat seals or extend the resulting heat-sealed area of the inflation inlet. The inflator/sealer device may similarly be adapted to provide the corresponding seal bars and contacts to provide for simultaneous or serial activation of the resistance wires.

Although the process has been discussed with respect to inflating and sealing one inflatable cushion 44, a plurality of inflatable cushions may be sealed and inflated simultaneously, for example by utilizing a line or web of inflatable cushions 168 (FIG. 9) in conjunction with a corresponding number of inflator/sealer devices 40. Further, a plurality of inflated cushions may be simultaneously sealed by heating one resistance wire 164 that runs continuously across several inlet throats 154 (FIG. 9) and engaging one sealing pad (not shown) that extends across the cushion throats. Alternatively, a web or roll of inflatable cushions 168 may be provided so that the cushions may be continuously fed and indexed to an inflation/sealing device of the present invention, for example, by using a tractor feed or similar continuous feeding methods known to those of skill in the art. In such cases, the inflated and sealed cushions may be detached from each other by tearing along perforations 172.

The inflator/sealer device 40 may include various features to enhance its operational safety and, for example, minimize the chance for damage to a finger that may be caught in a pinch point of the device during operation. Pinch points may be created when the paddle assembly 60 is engaged by extending piston rod 86 or when the retraction assembly 58 or sealing assembly 64 is engaged by extending piston rod 118. Accordingly, a control system (not shown) may be used to monitor the position of the piston rods and avoid application of a relatively strong force from the piston until confirmation that the extension of the piston rod has not been obstructed (for example, by a finger). Such a control system may include pressure regulators and valves (not shown) to control and modulate the supply pressure of the pressurized fluid that powers the pistons. Alternatively, the control system may track the position and speed of the piston rod position. If the speed of the extension of the piston rod unexpectedly decreases, then an obstruction may be assumed, and the control system may immediately reverse the piston rod to free the obstruction.

Manufacture of the Inflatable Cushions

Inflatable cushion 44 may be formed by juxtaposing top and bottom films 156, 158 so that their sealable layers (if the films are multilayered) confront one another. (FIG. 8.) The films are then sealed together in the perimeter zone 160. The sealing is preferably performed by heat sealing (e.g., conductance sealing, impulse sealing, ultrasonic sealing, dielectric sealing), but may be performed by application of a suitable adhesive (e.g., a UV-curable adhesive) between the films in the sealing zone 160. The films may also be sealed to each other in interior portions (not shown) of inflatable body 150—and further, some interior portions may be cut away—so that the inflatable cushion may take the desired shape and configuration when inflated, as is known in the art. The inflation hole 162 may be cut in top film 156 after or preferably before the films are sealed together.

Further, the inflatable body 150 and inflation inlet 151 may be formed separately and then connected, for example, by adhering or heat sealing one to the other. If the top and bottom films are sealed together before resistance wire 164 is inserted between the films, then the resistance wire may be later inserted across inlet passageway 154 by cutting or piercing contact holes 166 in the top film 156 at either side of inlet passageway 154 near zone 160. Resistance wire 164 may then be threaded into the first contact hole, between the top and bottom films and across throat 154, and out the second contact hole so that portions of the resistance wire extend from both of the contact holes. (FIG. 8.)

Alternatively, the resistance wire may be placed between the top and bottom films across throat 154 before the top and bottom films are sealed together at zone 160. In such case, the contact holes 170 in top sheet 156 may be positioned outside of the zone 160 that defines throat 154. The contact holes 170 may be cut in top film 156 after or preferably before the films are sealed together at zones 160. (FIG. 9.)

FIG. 22 depicts a method of continuously manufacturing a web 184 of inflatable cushions 168 utilizing production line 182. Webs of the top and bottom films 156, 158 are continuously fed from top-film unwind mandril 186 and bottom-film unwind mandril 188, respectively. Resistance wire 164 is simultaneously and continuously fed from wire unwind mandril or spool 190 to place the resistance wire between the top and bottom films. The term "continuously" in these contexts includes the sense of rolls or spools of material fed to a production line in a step-wise or indexed fashion to account for step-type unit operations (such as die cutting) that may occur within a production line.

For resistance wires having compositions and configurations that provide sufficient strength, the resistance wire may pull the weight of a rotating spool 190 of resistance wire 164 as the resistance wire is fed to the production line. However, the resistance wire 164 may be relatively easy to snap or break because of its small cross-sectional thickness and inherent strength characteristics. Accordingly, spool 190 preferably feeds resistance wire 164 to the production line while minimizing the load that may break the resistance wire. For example, where the resistance wire has an about 0.004 inch diameter and a 20 weight % chromium/80 weight % nickel alloy composition, spool 190 preferably helps prevent exposure of the resistance wire to above 1 pound force tension. Thus, spool 190 preferably comprises means for controlling or minimizing the load on resistance wire 164 in order to avoid exposing the resistance wire to unacceptably high forces as the resistance wire accelerates and decelerates with varying demands by the production line 182. Such means may include: i) a motor-driven spool 190 that is controlled by the demand for resistance wire 164 by the production line, or ii) a stationary or non-rotating spool 190 from which the resistance wire 164 is unwound by a rotating arm—similar to the way in which a fishing line may be unwound from a open-faced fishing reel, or iii) a clutch that disengages a brake on the spool when the tension in the resistance wire rises above a pre-determined level.

The resulting web 191 (top film, bottom film, and resistance wire) continues around guide roll 192, through inventory roller assembly 194, and around guide roller 196. As is known in the art, an inventory roller assembly includes a plurality of rollers that are moveable in the vertical direction relative to each other and serve to regulate the web inventory so that the various modules or unit operations within the production line may operate at varying speeds relative to each other.

After the web 191 travels over guide roller 196, the top film 156 is separated from the bottom film 158 and wire 164. The top film travels through punch assembly 198, which includes anvil roller 200 and one or more cutting blades 201. The punch assembly cuts the desired holes or shapes into top film 156—for example, the inflation hole 162 and the contact holes 170 as shown in FIG. 9. Although punch assembly 198 is depicted as a punch and rotary anvil combination, other configurations may be used to cut the desired holes or shapes in the top sheet, such as a rotary cutter or press cutter, as is known in the art. After the top sheet travels through the punch assembly, the top film 156 is reunited at feed rollers 202 with the bottom film 158 to again position the wire 164 between the top and bottom sheets and reform web 191. The web 191 then travels into the sealing module 205.

The sealing module 205 may utilize any of a number of known means to bond the top and bottom films together in zones 160 (FIG. 9) in order to repeatedly form the outline of an individual inflatable cushion 168 along web 191. For example, sealing module 205 may utilize known heat sealing techniques (e.g., conductance, impulse, ultrasonic, or dielectric sealing) to expose the two facing surfaces within zones 160 of top and bottom films 156, 158 to heat and pressure for a sufficient dwell time to seal the films together. Alternatively, the top and bottom films may be adhesively laminated together within sealing module 205 by applying a suitable adhesive system within zones 160 between the top and bottom films. Further, if a UV-curable adhesive has been applied in selected zones of the top and/or bottom sheets upstream from sealing module 205—for example downstream from top and bottom unwind mandrils 186, 188 and upstream from inventory 194—then sealing module 205 may expose the web 191 to UV radiation to cure the adhesive and form the bond. A print or eye mark (not shown) may be marked at each outline of an individual inflatable cushion along the web so that individual inflatable cushions may be indexed for subsequent cutting (discussed below) to form the desired shape. The resulting intermediate web 206—which now includes a series of individual inflatable cushions outlined by sealed zones 160 along the web—also contains the resistance wire 164 laminated or sealed between the top and bottom sheets in at least two areas of zone 160, as shown in FIG. 9. The intermediate web 206 then travels through feed rollers 207, inventory roller assembly 208, guide roller 209, and feed rollers 210 into die cut module 211.

The die cut module 211 may slit, perforate, or cut the desired shapes and configurations around the individually outlined inflatable cushions of web 206. For example, the die cut module 211 may form a line of perforations 172 between each of the inflatable cushions of the web to create a continuous web 184 in which the individual inflatable cushions may be detached (either before or after inflation) by tearing the web along the perforations. Further, die cut module 211 may incorporate a two-step arrangement in which a first punch (not shown) makes the desired cut on the portion of the cushion having the resistance wire, and a second punch (not shown) makes the remaining desired cuts. Since a cut made on the resistance wire may prematurely dull a cutting edge, this two-step arrangement confines such dulling to the first punch, which may incorporate a cutting edge less likely to dull or one that is more easily replaceable. Die cut modules are known to those of skill in the art and are therefore not discussed in detail here. The web 184 travels out of die cut module 211, through feed rollers 212, around guide roller 213, and onto rewind mandril 214.

If individual inflatable cushions 168 are desired—rather than a roll of continuous web 184 of inflatable cushions 168 as shown in FIG. 22—then die cut module 211 may cut the individual inflatable cushions from the web 206 to form a stack of inflatable cushions.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, use conditions, molecular weights, and the like, are to be understood as modified by the word "about" in describing the broadest scope of the invention. Any reference to an item in the disclosure or to an element in the claims in the singular using the articles "a," "an," "the," or "said" is not to be construed as limiting the item or element to the singular unless expressly so stated.

What is claimed is:

1. A machine for inflating and sealing an inflatable cushion having an inflatable body, an inflation portion defining an inflation aperture, an inflation inlet placing the inflatable body and the inflation portion in fluid communication, and a resistance wire extending at least across the internal width of the inflation inlet to define an inlet heat seal zone of the inflation inlet, the machine comprising:
    a base;
    an inflation tube supported by the base, the inflation tube having an inlet portion connected to a source of inflation fluid and an outlet portion larger than the inflation aperture of the inflatable cushion;
    a seal bar supported by the base;
    an anvil supported by the base;
    wherein the inflation tube and anvil are adjustable between:
        a tube/anvil engaged position in which the inflation tube outlet portion opposes the anvil, wherein the inflation tube and the anvil are capable of engaging the inflation portion of the inflatable cushion between the inflation tube outlet portion and the anvil so that the inflation tube outlet portion surrounds the inflation aperture to place the inflatable body in fluid communication with the source of inflation fluid; and
        a tube/anvil disengaged position in which the inflation tube and anvil are spaced apart, whereby the inflation portion of the inflatable cushion may be inserted or withdrawn from between the inflation tube and the anvil;
    wherein the seal bar and anvil are adjustable between:
        a bar/anvil engaged position in which the anvil opposes the seal bar, wherein the anvil and the seal bar are capable of compressing the inlet heat seal zone of the inflatable cushion between the anvil and seal bar; and
        a bar/anvil disengaged position in which the anvil and seal bar are spaced apart, whereby the inlet heat seal zone of the inflatable cushion may be inserted or withdrawn from between the anvil and the seal bar; and
    left and right contacts positioned on opposing sides of the seal bar at least during the bar/anvil engaged position, wherein the contacts are connected to an electrical power source and capable of touching the resistance wire of the inflatable cushion to complete an electrical circuit while the machine is in the bar/anvil engaged position.

2. The machine of claim 1 wherein:
    the anvil defines a slot; and
    the inflation tube outlet portion opposes the slot of the anvil while the machine is in the tube/anvil engaged position.

3. The machine of claim 1 wherein the anvil is pivotally supported by the base.

4. The machine of claim 1 wherein:
    the outlet portion of the inflation tube comprises an inflation cup;
    the inflation tube comprises an outer tube supported by the base and an inner tube slideably received within the outer tube;
    the machine further comprising:
        a supply platform at least partially beneath the inflation tube and capable of supporting a plurality of the inflatable cushions in stacked arrangement;
        a rear piston having a rear piston body and a rear piston rod extendible from the rear piston body, the rear piston rod being mechanically linked to the anvil, wherein the rear piston is capable of pivoting the anvil;
        a forward piston having a forward piston body and a forward piston rod mechanically linked to the inner tube of the inflation tube, wherein:
            the forward piston rod is extendible from the forward piston body to an extended position; and
            when the machine is in the tube/anvil disengaged position and the forward piston rod is in the extended position, the inflation cup of the inflation tube is capable of contacting at least one of the inflatable cushions in stacked arrangement on the supply platform;
    wherein the machine is switchable at least between:
        a first position in which the inflation tube is in fluid communication with the source of inflation fluid; and
        a second position in which the inflation tube is in fluid communication with a suction source; and
    wherein the inflation tube is capable of suctionably holding at least one of the inflatable cushions to the inflation cup when the forward piston rod is in the extended position and the machine is in the second position, whereby the inflation tube is capable of lifting one of the inflatable cushions from the supply stack as the forward piston rod is retracted while the machine is in the second position.

5. The machine of claim 4 further comprising a retraction assembly supported by the base, the retraction assembly comprising:
    an extendible suction tube connected to a suction source, the suction tube having:
        an outer tube supported by the base; and
        an inner tube slideably received within the outer tube and mechanically linked to the forward piston rod, wherein when the machine is in the tube/anvil disengaged position and the forward piston rod is in the extended position, the suction tube is capable of engaging at least one of the inflatable cushions in stacked arrangement on the supply platform;

wherein the suction tube is capable of suctionably holding at least one of the inflatable cushions when the forward piston rod is in the extended position, whereby the retraction assembly is capable of lifting one of the inflatable cushions from the supply stack as the forward piston rod is retracted.

6. The machine of claim 5 wherein:

the suction tube and the inflation tube are connected to the same suction source and inflation-fluid source;

the suction tube has a bottom portion proximate the anvil; and the retraction assembly further comprises a check valve in the suction tube so that the check valve prevents fluid flow out of the bottom portion of the suction tube.

7. A machine for sealing an inflatable cushion having an inflation inlet and a resistance wire extending at least across the internal width of the inflation inlet to define an inlet heat seal zone of the inflation inlet, the machine comprising:

a seal bar and an anvil that are adjustable between:

an engaged position in which the anvil opposes the seal bar, wherein the anvil and the seal bar are capable of compressing the inlet heat seal zone of the inflatable cushion between the anvil and seal bar; and a disengaged position in which the anvil and seal bar are spaced apart, whereby the inlet heat seal zone of the inflatable cushion may be inserted or withdrawn from between the anvil and the seal bar; and left and right contacts positioned on opposing sides of the seal bar at least when the seal bar and anvil are in the engaged position, wherein:

the contacts are connected to an electrical power source and are capable of touching the resistance wire to complete an electrical circuit when the seal bar and anvil are in the engaged position; and each of the contacts comprises an end adapted for piercing a plastic film.

8. The machine of claim 7 wherein each of the contacts have a pointed end adapted for piercing a plastic film.

9. A machine for sealing an inflatable cushion having an inflation inlet and a resistance wire internally in and extending at least across the internal width of the inflation inlet to define an inlet heat seal zone of the inflation inlet, the machine comprising:

a seal bar and an anvil that are adjustable between:

an engaged position in which the anvil opposes the seal bar, wherein the anvil and the seal bar are capable of compressing the inlet heat seal zone of the inflatable cushion between the anvil and seal bar; and a disengaged position in which the anvil and seal bar are spaced apart, whereby the inlet heat seal zone of the inflatable cushion may be inserted or withdrawn from between the anvil and the seal bar; and left and right contacts positioned on opposing sides of the seal bar at least when the seal bar and anvil are in the engaged position, wherein the contacts are:

connected to an electrical power source;

adapted to touch the resistance wire to complete an electrical circuit when the seal bar and anvil are in the engaged position; and adapted to be spaced apart from the resistance wire when the seal bar and anvil are in the disengaged position.

10. The machine of claim 9 further comprising a base, wherein the anvil is pivotally supported by the base so that the anvil is moveable between the engaged and disengaged positions.

11. The machine of claim 9 further comprising a piston having a piston body and a piston rod extendible from the piston body, the piston rod being mechanically linked to the anvil, wherein the piston is capable of moving the anvil between the engaged and disengaged positions.

12. The machine of claim 9 wherein the seal bar extends essentially the entire length between the contacts.

13. The machine of claim 9 further comprising a piston having a piston body and a piston rod extendible from the piston body, the piston rod being mechanically linked to the seal bar, wherein the piston is capable of pressing the seal bar against the inlet heat seal zone of the inflatable cushion when the seal bar and anvil are in the engaged position.

* * * * *